United States Patent
Zhang

(10) Patent No.: US 11,558,645 B2
(45) Date of Patent: Jan. 17, 2023

(54) METHOD FOR MANAGING LIVE-STREAMING ROOM, AND ELECTRONIC DEVICE

(71) Applicant: BEIJING DAJIA INTERNET INFORMATION TECHNOLOGY CO., LTD., Beijing (CN)

(72) Inventor: Yao Zhang, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 0 days.

(21) Appl. No.: 17/392,704

(22) Filed: Aug. 3, 2021

(65) Prior Publication Data
US 2022/0053221 A1    Feb. 17, 2022

(30) Foreign Application Priority Data
Aug. 14, 2020  (CN) .......................... 202010821275.7

(51) Int. Cl.
*H04N 21/2187*    (2011.01)
*H04N 21/239*    (2011.01)
(Continued)

(52) U.S. Cl.
CPC ..... *H04N 21/2187* (2013.01); *H04N 21/2393* (2013.01); *H04N 21/42204* (2013.01); *H04N 21/485* (2013.01); *H04N 21/25875* (2013.01)

(58) Field of Classification Search
CPC ........... H04N 21/2187; H04N 21/2393; H04N 21/42204; H04N 21/485; H04N 21/25875
See application file for complete search history.

(56) References Cited

U.S. PATENT DOCUMENTS

| | | | |
|---|---|---|---|
| 8,856,833 B2 * | 10/2014 | Conness | H04N 21/4828 725/46 |
| 2005/0097623 A1 * | 5/2005 | Tecot | G11B 27/10 725/136 |

(Continued)

FOREIGN PATENT DOCUMENTS

| | | |
|---|---|---|
| CN | 102932470 A | 2/2013 |
| CN | 105528731 A | 4/2016 |

(Continued)

OTHER PUBLICATIONS

The State Intellectual Property Office of People's Republic of China, First Office Action in Application No. 202010821275.7, dated Apr. 9, 2021, which is a foreign counterpart application corresponding to this U.S. Patent Application, to which this application claims priority.

(Continued)

*Primary Examiner* — Michael R Telan
(74) *Attorney, Agent, or Firm* — Kolitch Romano Dascenzo Gates LLC

(57) ABSTRACT

A method for managing a live-streaming room comprises displaying a first live-streaming interface of a live-streaming room by a first terminal; detecting a first operation through the first live-streaming interface; and sending a first instruction to a live-streaming server in response to the first operation, wherein the live-streaming server is configured to send the first instruction to a second terminal, the first instruction instructs the second terminal to perform a synchronization operation with the first terminal.

17 Claims, 11 Drawing Sheets

(51) Int. Cl.
*H04N 21/422* (2011.01)
*H04N 21/485* (2011.01)
*H04N 21/258* (2011.01)

(56) References Cited

U.S. PATENT DOCUMENTS

| | | | | |
|---|---|---|---|---|
| 2005/0251827 | A1* | 11/2005 | Ellis | H04N 7/163 |
| | | | | 725/47 |
| 2010/0211636 | A1* | 8/2010 | Starkenburg | H04N 21/43615 |
| | | | | 709/203 |
| 2012/0236160 | A1 | 9/2012 | Rezek et al. | |
| 2014/0323036 | A1* | 10/2014 | Daley | H04W 56/0015 |
| | | | | 455/3.06 |
| 2021/0306700 | A1 | 9/2021 | Xie et al. | |

FOREIGN PATENT DOCUMENTS

| | | |
|---|---|---|
| CN | 106385590 A | 2/2017 |
| CN | 106470343 A | 3/2017 |
| CN | 108920225 A | 11/2018 |
| CN | 109922377 A | 6/2019 |
| CN | 110535735 A | 12/2019 |
| CN | 111432266 A | 7/2020 |
| KR | 100653195 B1 | 12/2006 |
| WO | 2012040669 A1 | 3/2012 |

OTHER PUBLICATIONS

The State Intellectual Property Office of People's Republic of China, Second Office Action in Application No. 202010821275.7, dated Jul. 2, 2021, which is a foreign counterpart application corresponding to this U.S. Patent Application, to which this application claims priority.
European Search Report from the Hague, in EP 21189956.2 dated Nov. 26, 2021, which is an international application corresponding to this U.S. application.
Communication pursuant to Article 94(3) EPC of counterpart EP application No. 21189956.2 dated Jan. 5, 2022.
Notification to grant patent right for invention of counterpart Chinese application No. 202010821275.7 dated Jan. 17, 2022.

* cited by examiner

METHOD FOR MANAGING LIVE-STREAMING ROOM, AND ELECTRONIC DEVICE

This application is based on and claims priority to Chinese Patent Application No. 202010821275.7, filed on Aug. 14, 2020, the disclosure of which is herein incorporated by reference in its entirety.

TECHNICAL FIELD

The present disclosure relates to the field of Internet technologies, and in particular, relates to a method for managing a live-streaming room and an electronic device.

BACKGROUND

With the development of Internet technologies, live streaming is becoming popular as entertainment for users. At present, for diversity of the live-streaming content, many management functions are achieved by a live-streaming room, such as playing music, sending red envelopes, and displaying special effects. An anchor may manage various functions of the live-streaming room, just by triggering an operation in the live-streaming room.

SUMMARY

Embodiments of the present disclosure provide a method for managing a live-streaming room and an electronic device.

According to one aspect of the embodiments of the present disclosure, a method for managing a live-streaming room is provided. The method is applicable to a first terminal, and includes: displaying a first live-streaming interface of the live-streaming room, wherein the first live-streaming interface includes live-streaming data provided by a second terminal, the first terminal includes a terminal in a management mode of a target account, and the second terminal includes a terminal in a live-streaming mode of the target account; detecting a first operation through the first live-streaming interface; and sending a first instruction to a live-streaming server in response to the first operation, wherein the first instruction carries the target account, and the live-streaming server is configured to send the first instruction to the second terminal, and the first instruction instructs the second terminal to perform a synchronization operation with the first terminal.

According to another aspect of embodiments of the present disclosure, a method for managing a live-streaming room is provided. The method is applicable to a second terminal, and includes: receiving a first instruction from a live-streaming server, wherein the first instruction is sent by a first terminal and carries a target account; and performing a synchronization operation with the first terminal in response to the first instruction, wherein the second terminal includes a terminal in a live-streaming mode of the target account, the first terminal includes a terminal in a management mode of the target account, and the first instruction is sent by the first terminal through a first live-streaming interface in response to detecting a first operation.

According to another aspect of the embodiments of the present disclosure, a method for managing a live-streaming room is provided. The method is applicable to a live-streaming server, and includes: receiving a first instruction from a first terminal in response to a second terminal being in a live-streaming mode of a target account and the first terminal being in a management mode of the target account, wherein the first instruction carries the target account; and sending the first instruction to the second terminal, wherein the first instruction instructs the second terminal to perform a synchronization operation with the first terminal; wherein the first instruction is sent by the first terminal in response to detecting a first operation through a first live-streaming interface.

According to another aspect of the embodiments of the present disclosure, a system for managing a live-streaming room is provided. The system for managing the live-streaming room at least includes a second terminal, a first terminal, and a live-streaming server, wherein the first terminal includes a terminal in a management mode of a target account, and the second terminal includes a terminal in a live-streaming mode of the target account; the first terminal is configured to display a first live-streaming interface of the live-streaming room, wherein the first live-streaming interface includes live-streaming data provided by the second terminal; the first terminal is further configured to detect a first operation through the first live-streaming interface, and send a first instruction to the live-streaming server in response to the first operation, wherein the first instruction carries the target account; the live-streaming server is configured to send the first instruction to the second terminal; and the second terminal is configured to perform a synchronization operation with the first terminal in response to the first instruction.

According to another aspect of the embodiments of the present disclosure, an electronic device is provided. The electronic device includes: one or more processors; and a volatile or non-volatile memory configured to store one or more instructions executable by the one or more processors; wherein the one or more processors, when loading and executing the one or more instructions, are caused to perform the following operations: displaying a first live-streaming interface of the live-streaming room, wherein the first live-streaming interface comprises live-streaming data provided by a second terminal, the first terminal comprises a terminal in a management mode of a target account, and the second terminal comprises a terminal in a live-streaming mode of the target account; detecting a first operation through the first live-streaming interface; and sending a first instruction to a live-streaming server in response to the first operation, wherein the first instruction carries the target account, the live-streaming server is configured to send the first instruction to the second terminal, and the first instruction instructs the second terminal to perform a synchronization operation with the first terminal.

According to another aspect of the embodiments of the present disclosure, an electronic device is provided. The electronic device includes: one or more processors; and a volatile or non-volatile memory configured to store one or more instructions executable by the one or more processors; wherein the one or more processors, when loading and executing the one or more instructions, are caused to perform the following operations: receiving a first instruction from a live-streaming server, wherein the first instruction is sent by a first terminal and carries a target account; and performing a synchronization operation with the first terminal in response to the first instruction, wherein the second terminal comprises a terminal in a live-streaming mode of the target account, the first terminal comprises a terminal in a management mode of the target account, and the first instruction is sent by the first terminal through a first live-streaming interface in response to detecting a first operation.

According to another aspect of the embodiments of the present disclosure, an electronic device is provided. The electronic device includes: one or more processors; and a volatile or non-volatile memory configured to store one or more instructions executable by the one or more processors; wherein the one or more processors, when loading and executing the one or more instructions, are caused to perform the following operations: receiving a first instruction from a first terminal in response to a second terminal being in a live-streaming mode of a target account and the first terminal being in a management mode of the target account, wherein the first instruction carries the target account; and sending the first instruction to the second terminal, wherein the first instruction instructs the second terminal to perform a synchronization operation with the first terminal, wherein the first instruction is sent by the first terminal in response to detecting a first operation through a first live-streaming interface.

According to another aspect of the embodiments of the present disclosure, a non-transitory computer-readable storage medium is provided. The non-transitory computer-readable storage medium stores a computer program including one or more instructions therein. The one or more instructions, when loaded and executed by a processor of an electronic device, cause the electronic device to perform the following operations: displaying a first live-streaming interface of the live-streaming room, wherein the first live-streaming interface comprises live-streaming data provided by a second terminal, the first terminal comprises a terminal in a management mode of a target account, and the second terminal comprises a terminal in a live-streaming mode of the target account; detecting a first operation through the first live-streaming interface; and sending a first instruction to a live-streaming server in response to the first operation, wherein the first instruction carries the target account, the live-streaming server is configured to send the first instruction to the second terminal, and the first instruction instructs the second terminal to perform a synchronization operation with the first terminal.

According to another aspect of the embodiments of the present disclosure, a non-transitory computer-readable storage medium is provided. The non-transitory computer-readable storage medium stores a computer program including one or more instructions therein. The one or more instructions, when loaded and executed by a processor of an electronic device, cause the electronic device to perform the following operations: receiving a first instruction from a live-streaming server, wherein the first instruction is sent by a first terminal and carries a target account; and performing a synchronization operation with the first terminal in response to the first instruction, wherein the second terminal comprises a terminal in a live-streaming mode of the target account, the first terminal comprises a terminal in a management mode of the target account, and the first instruction is sent by the first terminal through a first live-streaming interface in response to detecting a first operation.

According to another aspect of the embodiments of the present disclosure, a non-transitory computer-readable storage medium is provided. The non-transitory computer-readable storage medium stores a computer program including one or more instructions therein. The one or more instructions, when loaded and executed by a processor of an electronic device, cause the electronic device to perform the following operations: receiving a first instruction from a first terminal in response to a second terminal being in a live-streaming mode of a target account and the first terminal being in a management mode of the target account, wherein the first instruction carries the target account; and sending the first instruction to the second terminal, wherein the first instruction instructs the second terminal to perform a synchronization operation with the first terminal, wherein the first instruction is sent by the first terminal in response to detecting a first operation through a first live-streaming interface.

According to another aspect of the embodiments of the present disclosure, a computer program product is provided. An instruction in the computer program product, which being executed by a processor of an electronic device, causes the electronic device to perform the following operations: displaying a first live-streaming interface of the live-streaming room, wherein the first live-streaming interface comprises live-streaming data provided by a second terminal, the first terminal comprises a terminal in a management mode of a target account, and the second terminal comprises a terminal in a live-streaming mode of the target account; detecting a first operation through the first live-streaming interface; and sending a first instruction to a live-streaming server in response to the first operation, wherein the first instruction carries the target account, the live-streaming server is configured to send the first instruction to the second terminal, and the first instruction instructs the second terminal to perform a synchronization operation with the first terminal.

According to another aspect of the embodiments of the present disclosure, a computer program product is provided. An instruction in the computer program product, which being executed by a processor of an electronic device, causes the electronic device to perform the following operations: receiving a first instruction from a live-streaming server, wherein the first instruction is sent by a first terminal and carries a target account; and performing a synchronization operation with the first terminal in response to the first instruction, wherein the second terminal comprises a terminal in a live-streaming mode of the target account, the first terminal comprises a terminal in a management mode of the target account, and the first instruction is sent by the first terminal through a first live-streaming interface in response to detecting a first operation.

According to another aspect of the embodiments of the present disclosure, a computer program product is provided. An instruction in the computer program product, which being executed by a processor of an electronic device, causes the electronic device to perform the following operations: receiving a first instruction from a first terminal in response to a second terminal being in a live-streaming mode of a target account and the first terminal being in a management mode of the target account, wherein the first instruction carries the target account; and sending the first instruction to the second terminal, wherein the first instruction instructs the second terminal to perform a synchronization operation with the first terminal, wherein the first instruction is sent by the first terminal in response to detecting a first operation through a first live-streaming interface.

DETAILED DESCRIPTION

Figure 1:
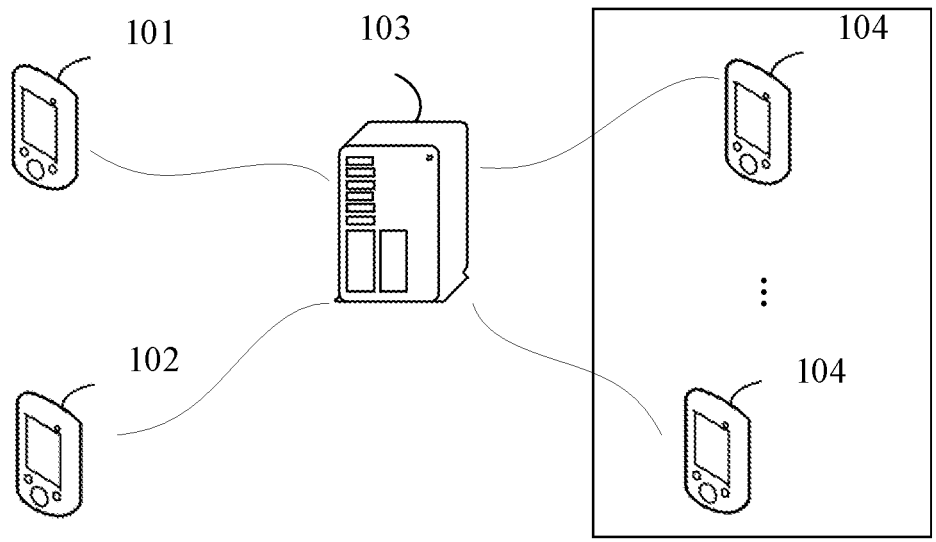
FIG. 1 is a schematic diagram of a system for managing a live-streaming room according to an exemplary embodiment.

FIG. 1 is a schematic diagram of a system for managing a live-streaming room according to an exemplary embodiment. This implementation environment includes a second terminal 101, at least one first terminal 102 and a live-streaming server 103. The second terminal 101 is connected to the live-streaming server 103 over a network. The at least one first terminal 102 is connected to the live-streaming server 103 over a network.

The second terminal 101 and the first terminal 102 may be portable terminals, pocket-sized terminals, handheld terminals or other types of terminals, such as a mobile phone, a computer, or a tablet computer. The live-streaming server 103 may be a server or a server cluster consisting of a plurality of servers, or a cloud computing center.

In some embodiments, the second terminal 101 is hosting a function of managing the live-streaming room to the first terminal 102. The second terminal 101 and the first terminal 102 log in based on the same target account, but are in different modes. The second terminal 101 is in a live-streaming mode and can perform live streaming in the live-streaming room, while the first terminal 102 is in a management mode and can manage the live-streaming room. The second terminal 101 can also manage the live-streaming room, and the live streaming can also be watched over the first terminal 102.

In some embodiments, the second terminal 101 and the at least one first terminal 102 each are installed with a target application. The live-streaming server 103 provides a service for the target application. The second terminal 101 and the at least one first terminal 102 interact with the live-streaming server 103 over the target applications.

In some embodiments, the second terminal 101 is installed with a first target application, and the at least one first terminal 102 is installed with a second target application. The live-streaming server 103 includes a first live-streaming server and a second live-streaming server. The first live-streaming server provides a service for the first target application, and the second live-streaming server provides a service for the second target application. The second terminal 101 interacts with the first live-streaming server over the first target application, and the first terminal 102 interacts with the second live-streaming server over the second target application. The first target application has a function of collecting live-streaming data, and the second target application has a function of displaying the live-streaming data and managing the live-streaming room.

In some embodiments, the system for managing the live-streaming room further includes a plurality of third terminals 104, which is connected to the live-streaming server 103 over a network. Over the plurality of third terminals 104 in the live-streaming room, the live streaming may be watched, and an interaction initiated by the second terminal 101 or the first terminal 102 in the live-streaming room may be responded.

The method according to the embodiment of the present disclosure is applicable to a live-streaming scenario.

In some embodiments, this method is applicable to a scenario where the second terminal fails to perform an interaction initiation operation.

In the case that an anchor makes live streaming over a web application, since the web application may perform the live streaming only and may not have an interaction initiation function, the interaction initiation operation may not be performed over the web application. By using the method for managing the live-streaming room according to the embodiment of the present disclosure, the anchor makes live streaming over the web application, and other operators perform the interaction initiation operation over the first terminal, such that an interaction may be initiated in the live-streaming room.

In some embodiments, this method is applicable to a scenario where the anchor is unfamiliar with the interaction initiation operation.

During the live-streaming process, in the case that the anchor is unfamiliar with the interaction initiation operation and needs to be assisted by other personnel in the interaction initiation operation, the method for managing the live-streaming room according to the embodiment of the present disclosure is used, in which the anchor makes live streaming over the second terminal, and other operators perform the interaction initiation operation over the first terminal, such that an interaction is initiated in the live-streaming room.

In some embodiments, this method is applicable in a scenario where the second terminal fails to play music.

In the case that the anchor makes live streaming over a web application, since the web application can perform the live streaming and do not have a music playing function, music may not be played over the web application. By using the method for managing the live-streaming room according to the embodiment of the present disclosure, the music can be played by other operator via the first terminal in the live-streaming room, such that the music can be played in the live-streaming room.

Figure 2:
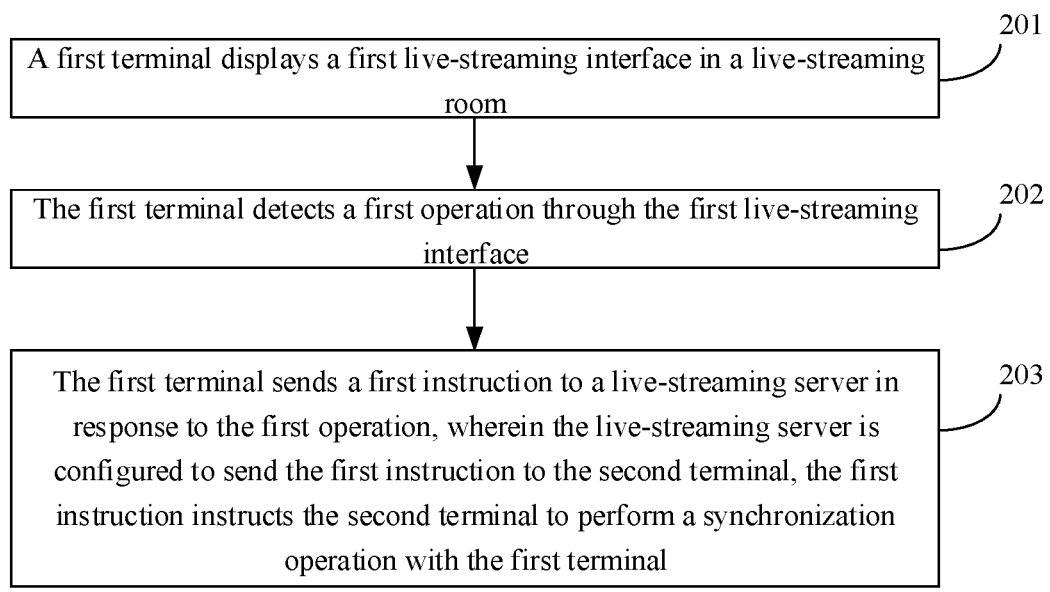
FIG. 2 is a flowchart of a method for managing a live-streaming room according to an exemplary embodiment.

FIG. 2 is a flowchart of a method for managing a live-streaming room according to an exemplary embodiment. Referring to FIG. 2, this method is applicable to a first terminal and includes the following processes.

In 201, the first terminal displays a first live-streaming interface of the live-streaming room.

In some embodiments, the first terminal includes a terminal in a management mode of a target account, that is, the first terminal includes a terminal that manages the live-streaming room. The second terminal includes a terminal in a live-streaming mode of the target account, that is, the second terminal includes a terminal in which an anchor performs live streaming. The target account includes an anchor account. Over the terminal in the management mode, the live streaming may be watched and operations may be performed, and the terminal in the live-streaming mode may perform the live streaming.

In some embodiments, the first terminal and the second terminal are both anchor terminals. When the anchor makes live streaming over the second terminal, in the case that the second terminal fails to operate the live-streaming room, the first terminal operates the live-streaming room.

In some embodiments, the second terminal is an anchor terminal, and the first terminal is a terminal of another user. For example, the other user of the first terminal is an operator related to the anchor. When the anchor performs live streaming over the second terminal, the other user may perform operations over the first terminal.

When the anchor makes the live streaming over the second terminal, live-streaming data is sent to a live-streaming server. The live-streaming server sends the live-streaming data to a terminal other than the second terminal in the live-streaming room. Then, the first terminal will also receive the live-streaming data. Next, the first terminal displays the live-streaming data through a first live-streaming interface. That is, the first live-streaming interface includes live-streaming data provided by the second terminal.

In 202, the first terminal detects a first operation through the first live-streaming interface.

A user may perform the first operation in the first terminal, and the first terminal may detect the first operation, so as to manage the live-streaming room corresponding to the target account.

In some embodiments, the first operation is a control operation. The control operation is an operation configured to control the functions of the live-streaming room, and the live-streaming room is managed by controlling the functions of the live-streaming room. For example, the control operation includes an interaction initiation operation, a music playing operation, a special effect displaying operation, a mute operation, a live-streaming room closing operation and various types of other operations.

In 203, the first terminal sends a first instruction to the live-streaming server in response to the first operation, wherein the live-streaming server is configured to send the first instruction to the second terminal, such that the second terminal performs a synchronization operation with the first terminal in response to the first instruction.

The first terminal may generate the first instruction corresponding to the first operation, and send the first instruction to the live-streaming server. The live-streaming server sends the first instruction to a terminal other than the first terminal in the live-streaming room.

In the case that the live-streaming server sends the first instruction to the second terminal, the second terminal may be synchronized with the first terminal in response to the first instruction. The first instruction instructs the second terminal to perform a synchronization operation with the first terminal, that is, the second terminal performs a synchronization operation with the first terminal. That is, in response to receiving the first instruction, the second terminal displays the same setting interface as in the first terminal. In the case that the live-streaming server sends the first instruction to a third terminal, that is, an audience terminal in the live-streaming room, the third terminal displays the corresponding live-streaming interface in response to the first instruction.

In the method according to the embodiment of the present disclosure, a function of managing the live-streaming room is hosted by the first terminal. During the live-streaming process performed by the second terminal, the first terminal can manage the live-streaming room. In this process, the anchor needs to perform live streaming only, without the need for other operations, which simplifies the operations of the anchor, facilitates normal proceeding of the live-streaming process, and improves effect of live-streaming. Moreover, by the synchronization operation, the operation in the first terminal and the operation in the second terminal are synchronized, thereby ensuring that the anchor learns the current management situation through the second terminal.

In the case that the live-streaming room is managed by the first terminal, in order to enable the anchor to learn the current management situation, the operation of the first terminal may be synchronized to the second terminal. The synchronization operation of the first terminal is described in the embodiment shown in FIG. 3 below.

Figure 3:
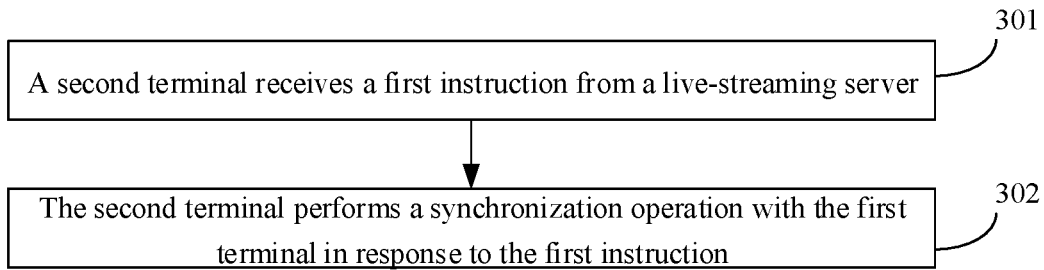
FIG. 3 is a flowchart of another method for managing a live-streaming room according to an exemplary embodiment.

FIG. 3 is a flowchart of another method for managing a live-streaming room according to an exemplary embodiment. Referring to FIG. 3, this method is applicable to a second terminal and includes the following processes.

In 301, the second terminal receives a first instruction from a live-streaming server.

In the embodiment of the present disclosure, in response to detecting a first operation, a first terminal sends the first instruction to the live-streaming server, and the live-streaming server sends the first instruction to the second terminal. The implementation in which the first terminal generates the first instruction is similar to the implementation shown in FIG. 2 described above, and thus details are not described herein any further.

In 302, the second terminal performs a synchronization operation with the first terminal in response to the first instruction.

In the method according to the embodiment of the present disclosure, a function of managing the live-streaming room is hosted by the first terminal. During the live-streaming process performed by the second terminal, the first terminal can manage the live-streaming room. In this process, the anchor needs to perform live streaming only, without the need for any other operations, which simplifies the operations of the anchor, facilitates normal proceeding of the live-streaming process, and improves effect of live-streaming. Moreover, by the operation synchronization, the operation in the first terminal and the operation in the second terminal are synchronized, thereby ensuring that the anchor learns the current management situation by the second terminal.

Figure 4:
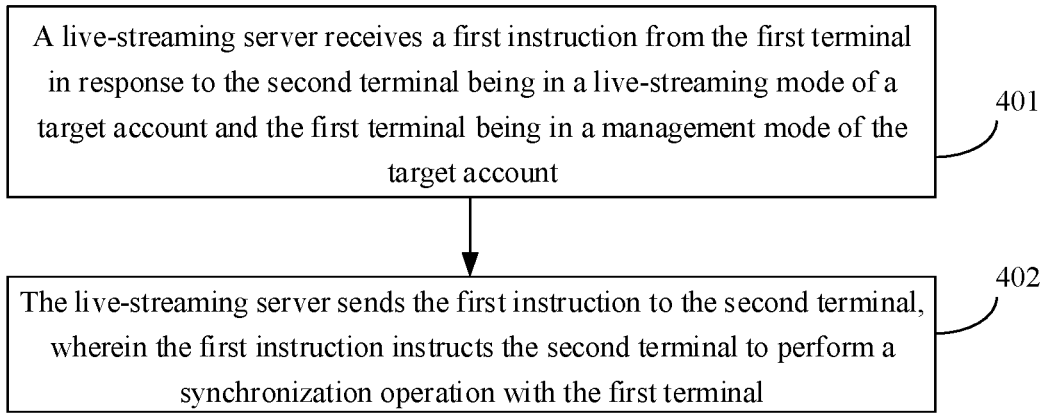
FIG. 4 is a flowchart of another method for managing a live-streaming room according to an exemplary embodiment.

FIG. 4 is a flowchart of another method for managing a live-streaming room according to an exemplary embodiment. Referring to FIG. 4, this method is applicable to a live-streaming server and includes the following processes.

In 401, the live-streaming server receives a first instruction from a first terminal in response to a second terminal being in a live-streaming mode of a target account and the first terminal being in a management mode of the target account, wherein the first instruction carries the target account.

In 402, the live-streaming server sends the first instruction to the second terminal, such that the second terminal performs a synchronization operation with the first terminal in response to the first instruction.

The first instruction is sent by the first terminal in response to detecting a first operation through a first live-streaming interface, and the first instruction instructs the second terminal to perform a synchronization operation with the first terminal.

In the method according to the embodiment of the present disclosure, a function of managing the live-streaming room is hosted by or performed by the first terminal. During the live-streaming process performed by the second terminal, the first terminal can manage the live-streaming room. In this process, the anchor needs to perform live streaming only, without any other operations, which simplifies the operations of the anchor, facilitates normal proceeding of the live-streaming process, and improves effect of live-streaming. Moreover, by the operation synchronization, the operation in the first terminal and the operation in the second terminal are synchronized, thereby ensuring that the anchor learns the current management situation by the second terminal.

In the related art, when the anchor wants to manage a live-streaming room during the live-streaming process, the anchor needs to operate in a second terminal. That is, the live streaming and operations are performed at the same time, the operations are relatively complicated. The introduction of the first terminal according to the present disclosure makes the live-streaming more convenient for the anchor during the living-streaming process. The function of managing the live-streaming room is hosted by the first terminal, and the first terminal can manage the live-streaming room, such that the anchor does not need to perform live streaming and operations at the same time during the live-streaming process.

Description will be made below by taking the fact that the first terminal performs an operation and synchronizes this operation to the second terminal as an example.

Figure 5:
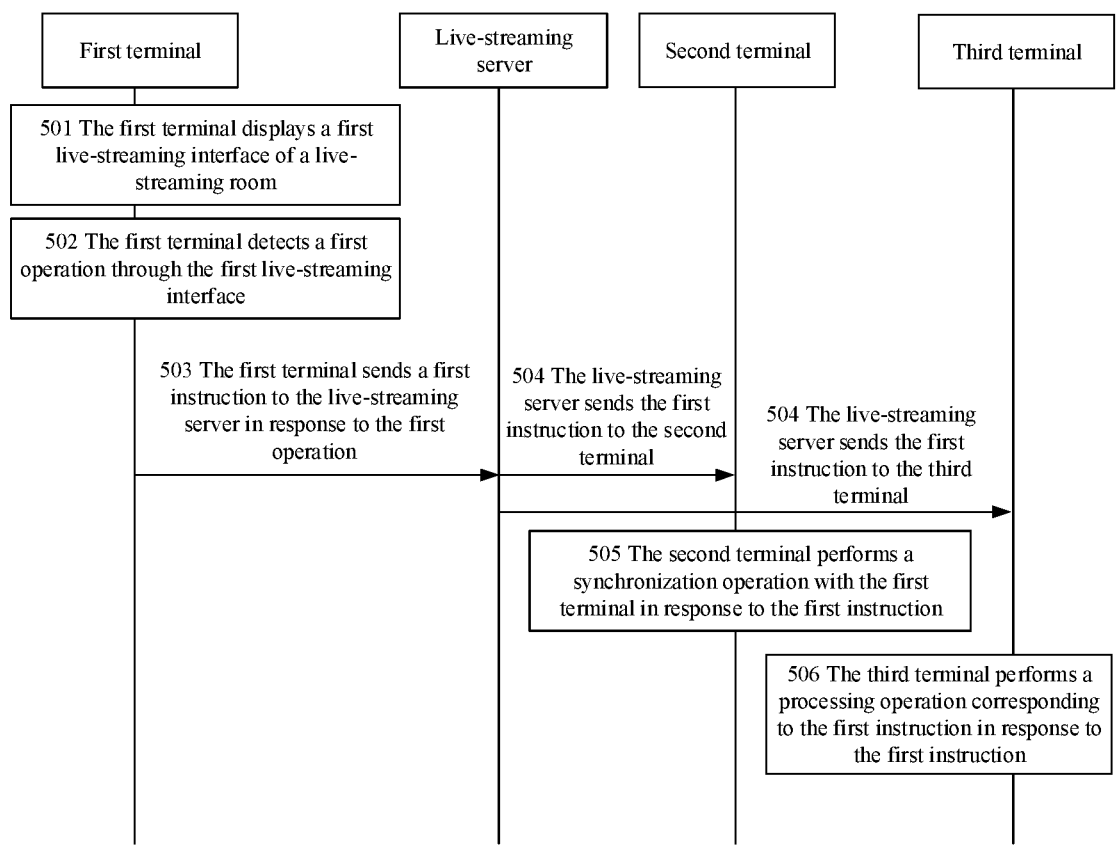
FIG. 5 is a flowchart of another method for managing a live-streaming room according to an exemplary embodiment.

FIG. 5 is a flowchart of another method for managing a live-streaming room according to an exemplary embodiment. Referring to FIG. 5, interaction subjects in this method include a second terminal, a first terminal, a live-streaming server, and a third terminal. The method includes the following processes.

In 501, the first terminal displays a first live-streaming interface of the live-streaming room.

In some embodiments, the first terminal and the second terminal are both anchor terminals. In the case that the anchor makes live streaming over the second terminal, the first terminal performs an operation in response to the second terminal failing to perform this operation.

In some embodiments, the second terminal is an anchor terminal, and the first terminal is a terminal of another user. For example, the other user of the first terminal is an operator related to the anchor. In the case that the anchor performs live streaming over the second terminal, the other user may perform operations over the first terminal.

In some embodiments, the first terminal and the second terminal each are installed with a target application, which is an application having a live-streaming function and a live-streaming room managing function. The first terminal displays the first live-streaming interface of the live-streaming room over the target application.

In 502, the first terminal detects a first operation through the first live-streaming interface.

In this embodiment of the present disclosure, the first operation includes an interaction initiation operation, a music playing operation, a special effect displaying operation, a mute operation, a live-streaming room closing operation and various types of other operations.

In some embodiments, with respect to the music playing operation, the target application has a music playing function, and the first terminal detects a music playing operation over the target application. In some embodiments, the first terminal displays a music playing interface over the target application; an operator selects any music in the music playing interface; and then, the music playing operation is detected.

In some embodiments, the first terminal displays a plurality of special effects to be displayed through the first live-streaming interface; the operator selects any special effect; and then, the selected special effect is displayed in the live-streaming room.

In some embodiments, with respect to the mute operation, in the case that the operator sees an audience in the live-streaming room making inappropriate comments, the operator may perform the mute operation to mute this audience.

In 503, the first terminal sends a first instruction to the live-streaming server in response to the first operation.

The first instruction is intended to control a terminal other than the first terminal in the live-streaming room to perform a processing operation corresponding to the first operation. The first instruction carries types and parameters of operations. For example, the first instruction is a music playing instruction, which carries a music playing type, a music identifier, and a playing progress.

In 504, the live-streaming server sends the first instruction to the second terminal and the third terminal.

In response to receiving the first instruction, the live-streaming server determines a live-streaming room corresponding to a target account based on the target account carried in the first instruction, and sends the first instruction to a terminal other than the first terminal in the live-streaming room. The terminals other than the first terminal include the second terminal and the third terminal.

In 505, the second terminal performs a synchronization operation with the first terminal in response to the first instruction.

In response to receiving the first instruction, the second terminal performs the synchronization operation, that is, the first instruction instructs the second terminal to perform a synchronization operation with the first terminal, and displays the same setting interface in the second terminal as that of the first terminal.

In some embodiments, for the music playing operation, in the case that the operator selects the music playing interface in the first terminal, music being played may be displayed in the music playing interface. In response to receiving the music playing instruction, the second terminal may also display the music playing interface and, based on the music identifier and the playing progress carried in the music playing instruction, display the music being played in the music playing interface, thereby realizing the synchronization of operations of the first terminal and the second terminal.

In some embodiments, for any type of operation, in the case that the second terminal performs the synchronization operation with the first terminal, a setting interface corresponding to this type of operation is displayed through the live-streaming interface. The second terminal detects a second operation through the setting interface, and sends a second instruction to the live-streaming server in response to the second operation.

In some embodiments, in the case that the first terminal detects the music playing operation, the second terminal performs operation synchronization. In response to displaying the music playing interface, where the anchor wants to close the music being played or play other music, the anchor may perform the music playing operation on the music playing interface by the second terminal, and send a music playing instruction to the live-streaming server in response to the music playing operation.

In 506, the third terminal performs a processing operation corresponding to the first instruction in response to the first instruction.

The third terminal performs the processing operation and updates the live-streaming interface accordingly. A trigger operation is an operation executed by the audience and indicated by the first instruction. For example, in the case that the operator performs a special effect displaying operation, the first terminal and the second terminal may display the selected special effect, and the updated live-streaming interface in the third terminal may also display the selected special effect. In some embodiments, in the case that the operator performs a red envelope dispensing operation, the first terminal and the second terminal may display a setting interface for setting the number of red envelops and the amount in each red envelope, while the updated live-streaming interface in the third terminal may display a red envelope grabbing interface, wherein the red envelope grabbing interface includes a red envelope grabbing button, and thus is different from the setting interface. In some embodiments, in the case that the operator performs the music playing operation, the first terminal and the second terminal may display the music playing interface, while the third terminal only plays music without displaying the music playing interface.

In some embodiments, only the terminal performing live streaming or the terminal managing the live-streaming room can perform the synchronization operation, and the terminal performing live streaming or the terminal managing the live-streaming room logs in based on the target account, such that the first instruction can indicate whether the current terminal performs the synchronization operation through the carried target account. That is, for the second terminal, the second terminal determines whether the currently logged-in account is the target account based on the received first instruction, and synchronizes operations executed by the first terminal under the condition that the second terminal logs in based on the target account; for the third terminal, the third terminal determines whether the currently logged-in account is the target account based on the received first instruction, and executes processing operation under the condition that the third terminal does not log in based on the target account.

In addition, for details about the interaction initiation operation, reference may be made to the embodiments shown in FIG. 7 and FIG. 8 below, which are not repeated herein.

It should be noted that the live-streaming room may include a plurality of third terminals. The embodiments of the present disclosure are only described by taking one third terminal as an example, and the operations performed by other third terminals are similar to those performed by the foregoing third terminal, which are not repeated herein.

In the method according to the embodiment of the present disclosure, a function of managing the live-streaming room is hosting by the first terminal. During the live-streaming process performed by the second terminal, the first terminal can manage the live-streaming room. In this process, the anchor needs to perform live streaming only, without any other operations, which simplifies the operations of the anchor, facilitates normal proceeding of the live-streaming process, and improves effect of live-streaming. Moreover, by the operation synchronization, the operation in the first terminal and the operation in the second terminal are synchronized, thereby ensuring that the anchor learns the current management situation by the second terminal.

Description will be made below by taking the fact that the second terminal performs an operation and synchronizes this operation to the first terminal as an example.

Figure 6:
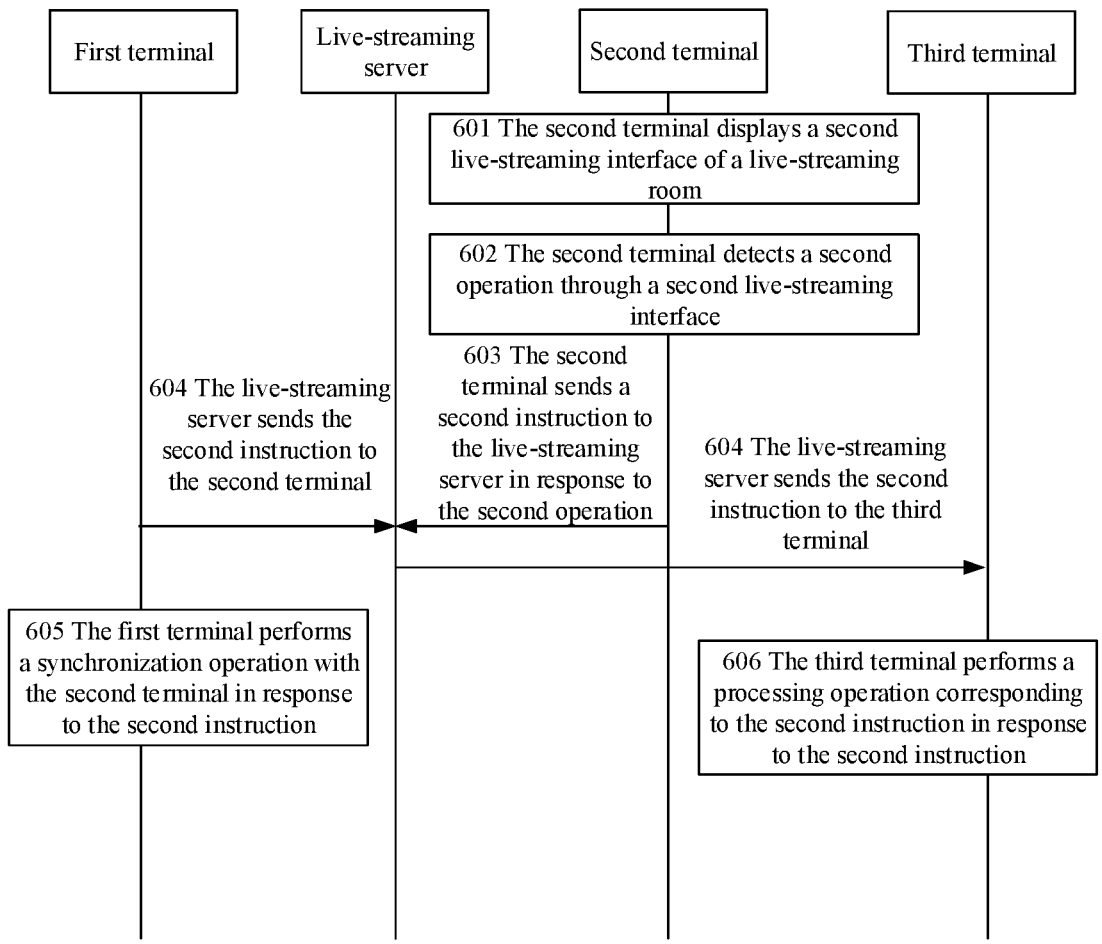
FIG. 6 is a flowchart of another method for managing a live-streaming room according to an exemplary embodiment.

FIG. 6 is a flowchart of another method for managing a live-streaming room according to an exemplary embodiment. Referring to FIG. 6, interaction subjects in this method include a second terminal, a first terminal, a live-streaming server, and a third terminal. The method includes the following processes.

In 601, the second terminal displays a second live-streaming interface of a live-streaming room.

In 602, the second terminal detects a second operation through the second live-streaming interface.

In 603, the second terminal sends the second instruction to the live-streaming server in response to the second operation.

In 604, the live-streaming server sends a second instruction to the first terminal and the third terminal.

In 605, the first terminal performs a synchronization operation with the second terminal in response to the second instruction.

The second instruction instructs the first terminal to perform a synchronization operation with the second terminal.

In 606, the third terminal performs a processing operation corresponding to the second instruction in response to the second instruction.

This exemplary embodiment is similar to the embodiment shown in FIG. 5 described above, and thus details are not described herein any further, except that: in this embodiment of the present disclosure, processes 601 to 603 are performed by the second terminal, that is, the anchor performs operations; and the second terminal manages the live-streaming room and synchronizes an operation of the second terminal to the first terminal, thereby achieving synchronization operation of the first terminal and the second terminal.

In the method according to the embodiment of the present disclosure, by the operation synchronization, the operation in the first terminal and the operation in the second terminal are synchronized.

In the related art, where the anchor wants to interact with an audience during the live-streaming process, the anchor needs to perform an interaction initiation operation in a second terminal. That is, the live streaming and the interaction initiation operation are realized at the same time, and the operation is relatively complicated. Therefore, in this embodiment of the present disclosure, in order to make the live streaming more convenient for the anchor during the live-streaming process, the first terminal is provided. The function of initiating an interaction is provided by the first terminal, and the first terminal can perform the interaction initiation operation and initiate the interaction in the live-streaming room, such that the anchor does not need to perform the live streaming and the interaction initiation operation at the same time during the live-streaming process.

Description will be made below by taking the fact that the second terminal performs an interaction initiation operation and synchronizes this interaction initiation operation to the first terminal as an example.

Figure 7:
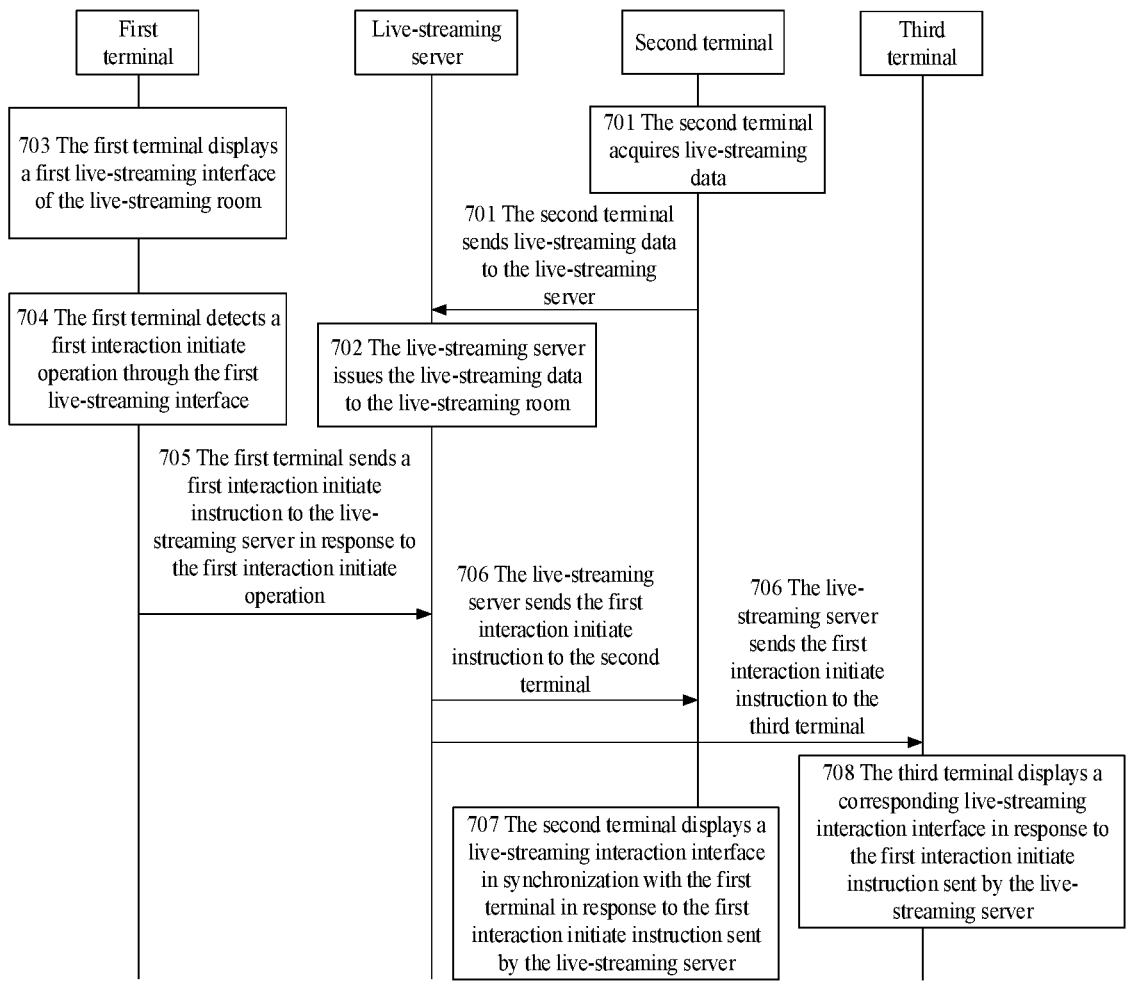
FIG. 7 is a flowchart of a method for initiating an interaction according to an exemplary embodiment.

FIG. 7 is a flowchart of another method for initiating an interaction according to an exemplary embodiment. Referring to FIG. 7, interaction subjects of this method include a second terminal, a first terminal, a live-streaming server, and a third terminal. This method includes the following processes.

In 701, the second terminal acquires live-streaming data and sends the live-streaming data to the live-streaming server.

In the embodiment of the present disclosure, the first terminal includes a terminal in a management mode of a target account, that is, the first terminal includes a terminal that performs an interaction initiation operation. The second terminal includes a terminal in a live-streaming mode of the target account, that is, the second terminal includes a terminal in which the anchor performs live streaming. The target account includes an anchor account. Over the terminal in the management mode, the live streaming may be watched and the interaction initiation operation may be performed; and the terminal in the live-streaming mode may perform the live streaming.

In some embodiments, the first terminal and the second terminal are both anchor terminals. In the case that the anchor makes live streaming over the second terminal, the first terminal performs the interaction initiation operation in response to the second terminal failing to perform this interaction initiation operation.

In some embodiments, the second terminal includes an anchor terminal, and the first terminal includes a terminal of another user, for example, the other user is an operator related to the anchor. In the case that the anchor performs live streaming over the second terminal, the other user may perform the interaction initiation operation over the first terminal.

The second terminal collects live-streaming data and sends the live-streaming data to the live-streaming server in the live-streaming process. The live-streaming data includes at least video data and audio data. For example, the video data is acquired by collecting a live-streaming screen by a camera of the second terminal; or the video data is acquired by recording the screen displayed in the second terminal; or the audio data is acquired by collecting a voice via a microphone.

In some embodiments, the second terminal is installed with a target application, which is an application having a live-streaming function and an interaction initiation function. The second terminal acquires live-streaming data over this target application and sends the live-streaming data to the live-streaming server corresponding to this target application. The live-streaming server sends the live-streaming data to the third terminal and the first terminal, thereby achieving the live streaming based on the target application. The third terminal includes a terminal over which an audience who watches the live streaming logs in based on his/her account.

In some embodiments, the second terminal is installed with a first target application, which is an application over which live streaming may be only performed, without an interaction initiation function. The first terminal is installed with a second target application, which is an application having an interaction initiation function. The live-streaming server includes a first live-streaming server and a second live-streaming server. The second terminal acquires live-streaming data over the first target application, and sends the live-streaming data to the first live-streaming server corresponding to the first target application. The first live-streaming server then sends the live-streaming data to the second live-streaming server, and the second live-streaming server sends the live-streaming data to the third terminal and the first terminal, thereby realizing live streaming based on a stream pushing mode of the first target application. For example, the first target application is a browser or other application, and the second target application is a live-streaming application.

In the case that the anchor performs the live streaming over the second terminal, the anchor needs to enter the live-streaming room first and perform the live streaming in the live-streaming room, the live-streaming room referring to a live-streaming room corresponding to a target account. The user of each account may open one live-streaming room. With respect to the live-streaming room corresponding to any account, this account is the target account, and other accounts in the live-streaming room are accounts of audiences.

At least one terminal may be logged in based on the account, wherein the terminal logged in based on the target account is the second terminal or the first terminal, and the terminal logged in based on the account of audience is the third terminal.

In some embodiments, in response to logging in based on the target account, the current mode of the terminal needs to be acquired to determine whether the terminal includes the second terminal or the first terminal based on the current mode of the terminal.

The user performs a trigger operation on a live-streaming portal of the live-streaming room corresponding to the target account, and the terminal displays a mode selection interface based on the trigger operation on the live-streaming portal, the mode selection interface including a live-streaming mode option and a management mode option. In the case that the user selects the management mode option, the terminal determines, in response to a selection operation for the management mode option, that the terminal is currently in the management mode, that is, determines that the terminal is the first terminal. In the case that the user selects the live-streaming mode option, the terminal determines, in response to a selection operation for the live-streaming mode option, that the terminal is currently in the live-streaming mode, that is, determines that the terminal is the second terminal.

In some embodiments, since only one second terminal is provided, in the case that other terminals logged in based on the target account have selected the live-streaming mode option before the user selects the live-streaming mode option, that is, the second terminal exists already, this terminal may select the management mode option, rather than the live-streaming mode option; or in the case that the terminal selects the live-streaming mode, a prompt message is displayed to remind the user that the second terminal exists already; or this terminal replaces the previous second terminal in response to selecting the live-streaming mode and serves as a new second terminal.

In some embodiments, the user may only be able to select the management mode in the case that the terminal is logged in based on the target account and the second terminal has been determined. That is, the anchor has started live streaming In this case, the anchor may select the management mode and enter the live-streaming room.

In 702, the live-streaming server issues the live-streaming data to the live-streaming room.

The live-streaming server issuing the live-streaming data to the live-streaming room means that the live-streaming data is sent to the first terminal and the third terminal in the live-streaming room. In response to receiving the live-streaming data, the first terminal and the third terminal display the live-streaming data through the live-streaming interface.

In some embodiments, the third terminal is installed with a third target application. The third target application enables the live streaming being watched over the third terminal, but has no function of performing an interaction operation. In the case that an audience watches the live streaming via the third target application, the second live-streaming server sends live-streaming data to a third live-streaming server corresponding to the third target application, and the third live-streaming server sends the live-streaming data to the third terminal. The third target application and the first target application are the same application or different applications. In the case that the third target application is the same as the first target application, the third live-streaming server is the same as the first live-streaming server.

In 703, the first terminal displays a first live-streaming interface of the live-streaming room.

In the case that the live-streaming server issues the live-streaming data to the live-streaming room, the first terminal in the live-streaming room displays the first live-streaming interface. The first live-streaming interface includes at least live-streaming data provided by the second terminal, such that the user is capable of watching the live streaming over the first terminal.

In some embodiments, the first terminal is installed with a second target application, and the first terminal displays the first live-streaming interface of the live-streaming room over the second target application. The second target application is an application over which the live streaming may be watched, and has an interaction initiation function.

In some embodiments, the first live-streaming interface further includes at least one interaction button, and subsequently, users may initiate an interaction by triggering any interaction button.

In 704, the first terminal detects a first interaction initiation operation through the first live-streaming interface.

In the embodiment of the present disclosure, a user may perform an interaction initiation operation in the first terminal, and the first terminal may detect the interaction initiation operation, so as to initiate an interaction over the first terminal.

In some embodiments, the first terminal and the third terminal each are installed with a target application. The first terminal detects the interaction initiation operation over the target application, acquires an interaction initiation instruction, and sends the interaction initiation instruction to the live-streaming server corresponding to the target application; and the live-streaming server initiates an interaction in the live-streaming room.

In the case that the first terminal displays the first live-streaming interface, the operator detects the first interaction initiation operation through the first live-streaming interface of the first terminal. The first interaction initiation operation is configured to initiate an interaction in the first terminal.

In some embodiments, the anchor asks the operator to perform the first interaction initiation operation; or the operator decides to perform the first interaction initiation operation himself/herself based on the current live-streaming situation.

In some embodiments, the first live-streaming interface includes at least one interaction button. The first terminal displays at least one interaction button through the first live-streaming interface, and the user performs a trigger operation on any of the at least one interaction button. The first terminal displays an interaction setting interface corresponding to a triggered interaction button in response to the trigger operation on the interaction button. The user sets interaction data in the interaction setting interface, and the first terminal acquires the predefined interaction data through the interaction setting interface. The interaction data includes an interaction object and an interaction parameter of the interaction object. The interaction object includes an object performing interaction in the live-streaming room. The interaction parameter indicates an interaction mode of the interaction object. The trigger operation is a click operation, a sliding operation or other operations. Interactions include dispensing red envelopes, drawing a lottery, issuing a special effect in the live-streaming room, and the like.

In some embodiments, with respect to the lottery, prizes of the lottery, the lottery number and the lottery conditions are set through an interaction setting interface corresponding to the lottery. The interaction object includes the prize, and the interaction parameter is the number of prizes that may be drawn and the lottery conditions. In the subsequent lottery, users who meet the lottery conditions may participate in the lottery. The prizes for the winning users are the set prizes, and the number of the winning users is a set number.

In some embodiments, with respect to dispensing of red envelops, the number of red envelopes and the amount in each red envelope are set through an interaction setting interface corresponding to the red envelopes, wherein the interaction object is the red envelop, and the interaction parameter includes the number of red envelopes and the amount in each red envelope. In the case that users grab red envelopes subsequently, the number of users who can grab red envelopes is the set amount of red envelopes, and the amount in the grabbed red envelope is the set amount.

In some embodiments, each interaction button in the first live-streaming interface corresponds to one interaction.

In 705, the first terminal sends the first interaction initiation instruction to the live-streaming server in response to the first interaction initiation operation.

In response to detecting the first interaction initiation operation, the first terminal sends the first interaction initiation instruction to the live-streaming server. The first interaction initiation instruction carries a target account, which is configured to instruct the live-streaming server to initiate an interaction in a live-streaming room corresponding to the target account.

In some embodiments, in the case that the first terminal has set the interaction data, the first interaction initiation instruction also carries the interaction data.

In some embodiments, the live-streaming server provides an application programming interface (API), and calls the API to receive the first interaction initiation instruction from the first terminal.

In 706, the live-streaming server sends the first interaction initiation instruction to the second terminal and the third terminal.

In response to receiving the first interaction initiation instruction, the live-streaming server determines a live-streaming room where an interaction needs to be initiated, based on the target account carried in the first interaction initiation instruction, and initiates the interaction in the live-streaming room corresponding to the target account. Initiating the interaction in the live-streaming includes sending the first interaction initiation instruction to the second terminal and the third terminal in the live-streaming room.

In some embodiments, the first terminal, the third terminal and the second terminal each are installed with a target application. The first terminal sends the first interaction initiation instruction to a live-streaming server corresponding to the target application. The live-streaming server sends the first interaction initiation instruction to the third terminal and the second terminal. The third terminal and the second terminal receive the first interaction initiation instruction over the target applications.

In some embodiments, the second terminal is installed with a first target application, and the first terminal and the third terminal each are installed with a second target application. The first terminal sends a first interaction initiation instruction to a second live-streaming server corresponding to the second target application. The second live-streaming server sends the first interaction initiation instruction to the third terminal and the first live-streaming server corresponding to the first target application. The third terminal receives the first interaction initiation instruction over the second target application. The first live-streaming server sends the first interaction initiation instruction to the second terminal, and the second terminal receives the first interaction initiation instruction over the first target application.

In some embodiments, the first interaction initiation instruction also carries interaction data. In the case that the live-streaming server sends the first interaction initiation instruction to the second terminal, the second terminal receives the first interaction initiation instruction, thereby synchronizing the interaction data set by the first terminal to the second terminal.

The purpose of the live-streaming server sending an interaction initiation instruction to the third terminal is to make an interaction with the audience, while the purpose of the sending the interaction initiation instruction to the second terminal is to synchronize the interaction data to the second terminal. Owing to the different purposes of sending the interaction initiation instruction, the second terminal and the third terminal display different interfaces in response to receiving the interaction initiation instruction respectively.

With respect to the second terminal in the live-streaming room, the live-streaming server sends the first interaction initiation instruction to the second terminal directly.

In some embodiments, the live-streaming server stores a target account and a terminal identifier of each terminal logged in based on the target account therein. The first interaction initiation instruction carries the terminal identifier of the first terminal. In response to receiving the first interaction initiation instruction carrying the target account, the live-streaming server acquires the terminal identifier corresponding to the target account, and sends the first interaction initiation instruction to a terminal other than the first terminal corresponding to the terminal identifier corresponding to the target account.

In some embodiments, in the case that the first terminal performs an interaction initiation operation over the second target application and the second terminal performs live streaming over the first target application, the second live-streaming server corresponding to the second target application stores the target account, the terminal identifier of each terminal logged in based on the target account, and an application identifier of the first target application therein. The first interaction initiation instruction carries the target account logged in by the first terminal. In response to receiving the first interaction initiation instruction carrying the target account, the second live-streaming server acquires a terminal identifier and an application identifier corresponding to this target account, and sends this first interaction initiation instruction to the first live-streaming server corresponding to this application identifier. The first live-streaming server sends the first interaction initiation instruction to a terminal (the second terminal) corresponding to the terminal identifier.

In some embodiments, the live-streaming server sends a first interaction initiation instruction to the second terminal over a long link. The long link means that in the case that a long link is established between two devices, a plurality of data packets may be sent continuously over the long link. Therefore, the live-streaming server may send the first interaction initiation instruction to the second terminal by interacting with the second terminal over the long link, thereby avoiding the establishment of a new link every time it is sent.

With respect to the third terminal in the live-streaming room, the live-streaming server sends the first interaction initiation instruction to the third terminal. In response to receiving the first interaction initiation instruction, the third terminal displays a corresponding interaction interface, and the user operates in the interaction interface.

In the case that the first terminal performs the interaction initiation operation over the second target application, and in the case that a user, over any third terminal, watches the live streaming over the third target application, since the third target application has no function of performing an interaction operation, in response to receiving the first interaction initiation instruction, the second live-streaming server no longer sends the first interaction initiation instruction to the third terminal, but only needs to send the first interaction initiation instruction to the third terminal that has a function of performing the interaction operation.

In some embodiments, the first interaction initiation instruction carries an interaction type and interaction data. The live-streaming server determines the corresponding interaction according to the interaction type, acquires a display mode of the interaction in the third terminal, and sends the display mode and the interaction data to the third terminal.

In some embodiments, in response to a lottery event, in response to receiving the first interaction initiation instruction, the live-streaming server sends display data corresponding to the first interaction initiation instruction to the third terminal; and the third terminal displays a lottery interface corresponding to the lottery event based on the received display data, the lottery interface including prizes of the lottery, the lottery number and lottery conditions.

In 707, the second terminal displays a live-streaming interaction interface in synchronization with the first terminal in response to the first interaction initiation instruction sent by the live-streaming server.

With respect to the second terminal, the first interaction initiation instruction instructs the second terminal to display a live-streaming interaction interface in synchronization with the first terminal. The first interaction initiation instruction carries the interaction data. The second terminal acquires the interaction data by receiving the first interaction initiation instruction from the live-streaming server, such that the interaction data acquired by the first terminal is synchronized to the second terminal, thereby realizing the synchronization of the interaction initiation operation in the first terminal and the interaction initiation operation in the second terminal, and ensuring that the anchor learns the current interaction situation over the second terminal.

In some embodiments, the second terminal displays a live-streaming interaction interface based on the interaction data. A live-streaming interaction interface corresponding to an interaction object is displayed based on the interaction object in the interaction data. The live-streaming interaction interface including the interaction data is acquired by adding the interaction parameter of the interaction object to the live-streaming interaction interface.

In some embodiments, for dispensing red envelops, the interaction object is the red envelop, and the interaction parameter includes the number of red envelops and the amount in each red envelop. A live-streaming interaction interface corresponding to the red envelops is displayed, the live-streaming interaction interface including a red envelope number setting area and a red envelope amount setting area. The number of red envelopes is displayed in the red envelope number setting area, and the amount in each red envelope is displayed in the red envelope amount setting area, thereby achieving the synchronization with the first terminal.

In 708, the third terminal displays a corresponding live-streaming interaction interface in response to the first interaction initiation instruction sent by the live-streaming server.

With respect to the third terminal, the first interaction initiation instruction carries interaction data. In response to receiving the first interaction initiation instruction, the third terminal displays a corresponding interaction interface based on the interaction object in the interaction data. For example, for dispensing red envelops, in response to receiving the first interaction initiation instruction, the third terminal displays a red envelop interface, such that the user may receive the red envelope or view the number of the red envelops and the amount in each red envelope by operating in the red envelope interface.

It should be noted that the difference between the live-streaming interaction interface displayed by the third terminal and the live-streaming interaction interface displayed by the second terminal is that the live-streaming interaction interface displayed by the second terminal is an interface initiating interaction in the live-streaming room, and the live-streaming interaction interface displayed by the third terminal is an interface interacting with the audiences in the live-streaming room.

Moreover, in some embodiments, the live-streaming server sends the first interaction initiation instruction to a content delivery network (CDN), and the CDN sends the first interaction initiation instruction to the third terminal. Therefore, in the case that the user watches the live streaming over the third terminal, the CDN closest to the third terminal may send live-streaming data and an interaction initiation instruction to the third terminal, thereby ensuring the fluency of live streaming.

It should be noted that this embodiment of the present disclosure is only described by taking one first terminal as an example. In another embodiment, a live-streaming room managing system may include a plurality of first terminals, each of which may perform an interaction initiation operation.

It should be further noted that this embodiment of the present disclosure is only described by taking one first terminal performing the interaction initiation operation as an example. In another embodiment, in response to a plurality of interactions, in the case that an interaction initiation operation is performed in one first terminal, other interaction initiation operations of operations other than this interaction may be performed in the second terminal or other first terminals at the same time. For example, a red envelope dispensing operation is performed in the first terminal, while a lottery initiation operation is performed in the second terminal.

In the method according to the embodiment of the present disclosure, a function of initiating an interaction in the live-streaming room is hosted by the first terminal. During the live-streaming process performed by the second terminal, the first terminal can perform an interaction initiation operation, thereby initiating an interaction in the live-streaming room. In this process, the anchor needs to perform live streaming only, without any interaction initiation operation, which simplifies the operations of the anchor, facilitates normal proceeding of the live-streaming process, and improves effect of live-streaming.

In some embodiments, the interaction data acquired by the first terminal is synchronized to the second terminal, thereby realizing the synchronization of the interaction initiation operation in the first terminal and the interaction initiation operation in the second terminal, and ensuring that the anchor learns the current interaction situation over the second terminal.

In some embodiments, the second terminal may also perform an interaction initiation operation, and may determine which terminal performs the interaction initiation operation, without depending on only one terminal anymore, thereby improving the flexibility.

In some embodiments, where the second terminal performs live streaming over the first target application, in the case that the anchor wants to perform an interaction initiation operation over the first target application, the first target application needs to have an interaction initiation function, and thus technicians need to spend a long time developing the interaction initiation function of the first target application. In addition, for a plurality of applications other than the target application, in the case that the plurality of other applications have the interaction initiation function, the technicians need to carry out repeated development of the interaction initiation function. In addition, even in the case that the plurality of applications have the interaction initiation function, due to the differences in the plurality of applications, it is difficult to ensure the unity of interaction initiation operations in the plurality of applications, which will also bring inconvenience to the operations of the anchor. In this embodiment of the present disclosure, a function of initiating an interaction in the live-streaming room is hosted by the first terminal. During the live-streaming process performed by the second terminal over the first target application, the first terminal can perform an interaction initiation operation over the second target application, without developing any interaction initiation function for the second target application, which solves the problem of repeated development of the interaction initiation function, simplifies the operations of the anchor, facilitates normal proceeding of the live-streaming process, and improves effect of live-streaming.

Description will be made below by taking the fact that the second terminal performs an interaction initiation operation and synchronizes this interaction initiation operation to the first terminal.

Figure 8:
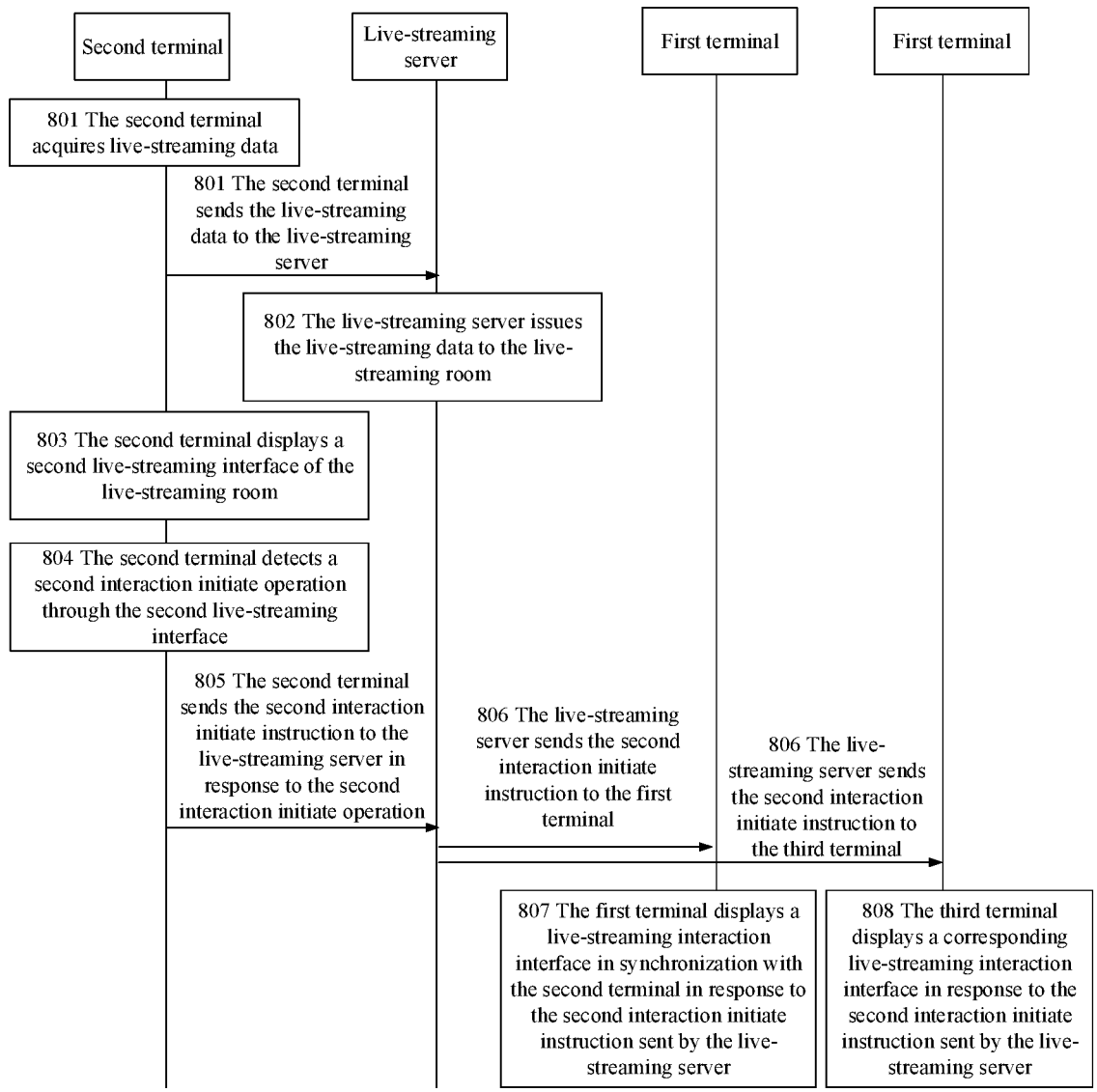
FIG. 8 is a flowchart of another method for initiating an interaction according to an exemplary embodiment.

FIG. 8 is a flowchart of a method for initiating an interaction according to an exemplary embodiment. Referring to FIG. 8, interaction subjects of this method include a second terminal, a first terminal, a live-streaming server and a third terminal. This method includes the following processes.

In 801, the second terminal acquires live-streaming data and sends the live-streaming data to the live-streaming server.

The second terminal collects live-streaming data and sends the live-streaming data to the live-streaming server in the live-streaming process of the anchor. The live-streaming data includes at least video data and audio data. For example, the video data is acquired by collecting a live-streaming screen via a camera of the second terminal; or the video data is acquired by recording the screen displayed in the second terminal; or the audio data is acquired by collecting a voice via a microphone.

In some embodiments, the second terminal is installed with a target application, which is an application having a live-streaming function and an interaction initiation function. The second terminal acquires live-streaming data over this target application and sends the live-streaming data to the live-streaming server corresponding to this target application. The live-streaming server sends the live-streaming data to the third terminal and the first terminal, thereby achieving the live streaming based on the target application.

In 802, the live-streaming server issues the live-streaming data to the live-streaming room.

The live-streaming server sends the live-streaming data to the first terminal and the third terminal in the live-streaming room. The first terminal and the third terminal display the live-streaming data through the live-streaming interface in response to receiving the live-streaming data.

In 803, the second terminal displays a second live-streaming interface of the live-streaming room.

The second live-streaming interface includes at least live-streaming data. That is, the second terminal displays the live-streaming data through the first live-streaming interface.

In some embodiments, the first live-streaming interface further includes at least one interaction button, and subsequently, the anchor may initiate an interaction by performing a trigger operation on any of the at least one interaction button.

In 804, the second terminal detects a second interaction initiation operation through the second live-streaming interface.

In the embodiment of the present disclosure, the second terminal may perform live streaming and an interaction initiation operation. In the case that the second terminal performs the live streaming, the operation of sending the live-streaming data to the live-streaming server is a stream push operation. However, in the case that the live-streaming server sends the live-streaming data to the first terminal and the third terminal, the first terminal and the third terminal receive the live-streaming data, and the operation of receiving the live-streaming data belongs to a stream pull operation. Then, the operations that may be performed by the second terminal, the first terminal, and the third terminal are shown in Table 1 below:

TABLE 1

| | Live-streaming data | Interaction initiation operation |
|---|---|---|
| Second terminal | Stream push operation | Capable of performing interaction initiation operation |
| First terminal | Stream pull operation | Capable of performing interaction initiation operation |
| Third terminal | Stream pull operation | Incapable of performing interaction initiation operation |

In 805, the second terminal sends a second interaction initiation instruction to the live-streaming server in response to a second interaction initiation operation.

In 806, the live-streaming server sends the second interaction initiation instruction to the first terminal and the third terminal.

Practice of processes 803 to 806 is similar to that of processes 703 to 706 in the embodiment shown in FIG. 7, except that: processes 803 to 806 are executed by the second terminal, the second terminal performs the second interaction initiation operation and sends the second interaction initiation instruction to the live-streaming server, and the live-streaming server then initiates an interaction in the live-streaming room corresponding to the target account in response to the second interaction initiation instruction, wherein initiating the interaction in the live-streaming includes sending the first interaction initiation instruction to the first terminal and the third terminal in the live-streaming room.

In some embodiments, the second live-streaming interface includes at least one interaction button. The second terminal displays at least one interaction button through the second live-streaming interface, and the anchor performs a trigger operation on any of the at least one interaction button. The second terminal displays an interaction setting interface corresponding to a triggered interaction button in response to the trigger operation on the interaction button. The anchor sets interaction data in the interaction setting interface, and the second terminal acquires the predefined interaction data through the interaction setting interface.

In some embodiments, the second interaction initiation operation and the first interaction initiation operation are operations for the same interaction; or the second interaction initiation operation and the first interaction initiation operation are operations for different interactions.

In 807, the first terminal displays a live-streaming interaction interface in synchronization with the second terminal in response to the second interaction initiation instruction sent by the live-streaming server.

The second instruction instructs the first terminal to perform a synchronization operation with the second terminal.

In 808, the third terminal displays a corresponding live-streaming interaction interface in response to the second interaction initiation instruction sent by the live-streaming server.

Practice of processes 807 and 808 is similar to that of processes 707 and 708 in the embodiment shown in FIG. 7, except that: in process 807, the first terminal receives the second interaction initiation instruction from the live-streaming server and synchronizes the interaction data set in the second terminal to the first terminal.

It should be noted that the interaction data acquired by the first terminal in the embodiment shown in FIG. 7 and the interaction data acquired by the second terminal in the embodiment shown in FIG. 8 include the same data types, for example, both include an interaction object and an interaction parameter of the interaction object. The difference between the two interaction data is: the interaction data obtained by the first terminal is set through the interaction setting interface displayed by the first terminal, and the interaction data obtained by the second terminal is set through the interaction setting interface displayed by the second terminal.

In the method according to this embodiment of the present disclosure, a function of initiating an interaction in the live-streaming room is hosted by the first terminal. During the live-streaming process performed by the second terminal, the first terminal can perform an interaction initiation operation, thereby initiating an interaction in the live-streaming room. In this process, the anchor needs to perform live streaming only, without any interaction initiation operation, which simplifies the operations of the anchor, facilitates normal proceeding of the live-streaming process, and improves effect of live-streaming In addition, the interaction data acquired by the first terminal is synchronized to the second terminal, thereby realizing the synchronization of the interaction initiation operation in the first terminal and the interaction initiation operation in the second terminal, and ensuring that the anchor learns the current interaction situation over the second terminal.

In some embodiments, the second terminal may also perform an interaction initiation operation, and may determine which terminal performs the interaction initiation operation, without depending on only one terminal anymore, thereby improving the flexibility.

Figure 9:
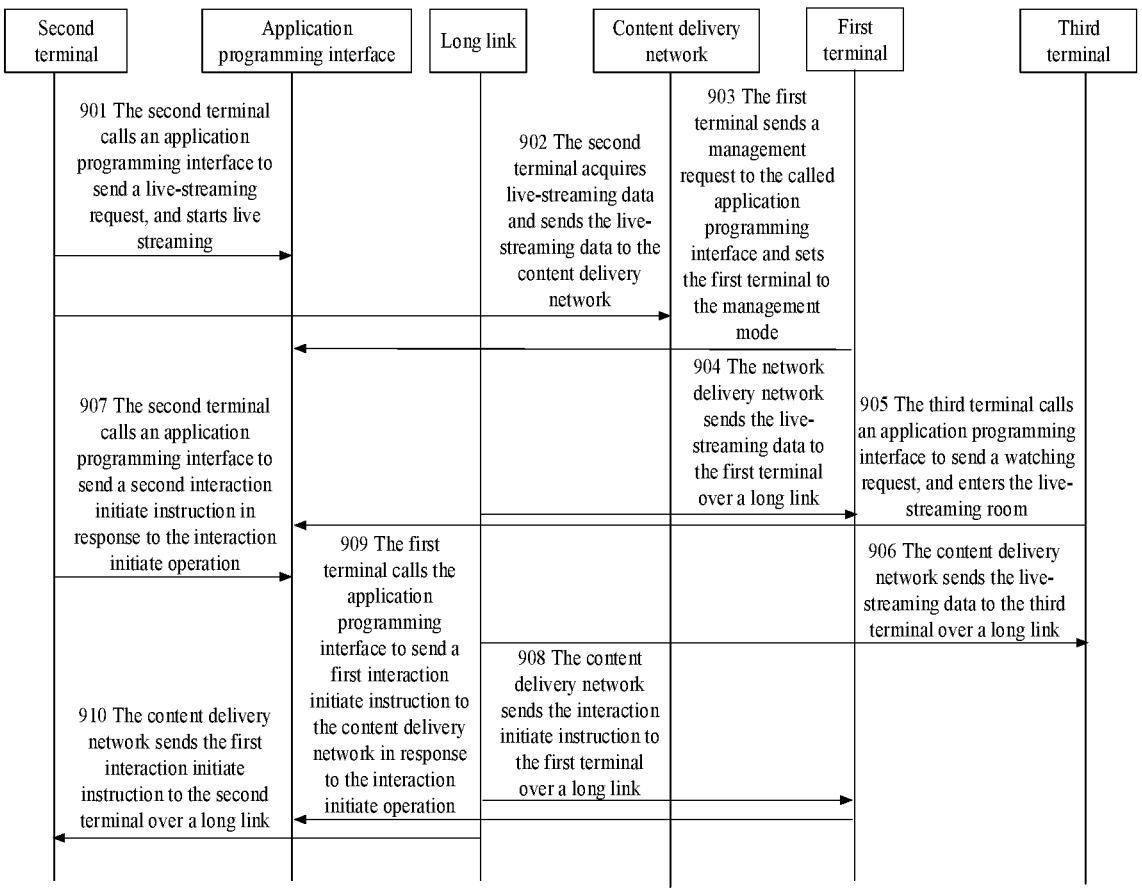
FIG. 9 is a flowchart of another method for initiating an interaction according to an exemplary embodiment.

FIG. 9 is a flowchart of a method for initiating an interaction according to an exemplary embodiment. Referring to FIG. 9, interaction subjects of this method include a second terminal, a first terminal, a content delivery network and a third terminal. This method includes the following processes.

In 901, the second terminal calls an application programming interface to send a live-streaming request, and starts live streaming.

In 902, the second terminal acquires live-streaming data and sends the live-streaming data to the content delivery network.

In 903, the first terminal sends a management request to the application programming interface and sets the first terminal to the management mode.

In 904, the content delivery network sends the live-streaming data to the first terminal over a long link.

In 905, the third terminal calls an application programming interface to send a watching request, and enters the live-streaming room.

In 906, the content delivery network sends the live-streaming data to the third terminal over a long link.

In processes 901 to 906, the second terminal starts the live streaming, and the live streaming is watched over the first terminal and the third terminal. In some embodiments, in the live-streaming process, referring to the following processes 907 and 908, the second terminal performs an interaction initiation operation and synchronizes the interaction data to the first terminal.

In 907, the second terminal calls an application programming interface to send an interaction initiation instruction to the content delivery network in response to the interaction initiation operation.

In 908, the content delivery network sends the interaction initiation instruction to the first terminal over a long link.

In some embodiments, referring to the following processes 909 and 910, the first terminal performs an interaction initiation operation and synchronizes the interaction data to the second terminal.

In 909, the first terminal calls the application programming interface to send the interaction initiation instruction to the content delivery network in response to the interaction initiation operation.

In 910, the content delivery network sends the interaction initiation instruction to the second terminal over a long link.

In the embodiment of the present disclosure, a long link is established between the second terminal and the content delivery network; and a long link is established between the first terminal and the content delivery network.

Practice of processes 901 to 910 is similar to that shown in FIG. 7 and FIG. 8, and thus details are not described herein any further.

Figure 10:
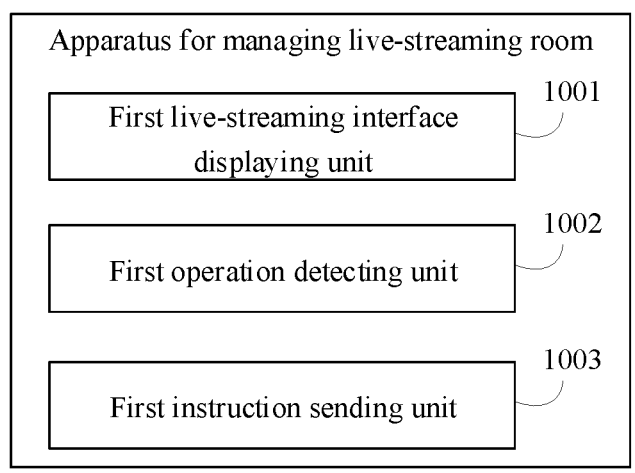
FIG. 10 is a block diagram of an apparatus for managing a live-streaming room according to an exemplary embodiment.

FIG. 10 is a block diagram of an apparatus for managing a live-streaming room according to an exemplary embodiment. The apparatus for managing the live-streaming room is applicable to a first terminal. Referring to FIG. 10, the apparatus includes:

a first live-streaming interface displaying unit 1001, configured to display a first live-streaming interface of the live-streaming room, wherein the first live-streaming interface includes live-streaming data provided by a second terminal, the first terminal includes a terminal in a management mode of a target account, and the second terminal includes a terminal in a live-streaming mode of the target account;

a first operation detecting unit 1002, configured to detect a first operation through the first live-streaming interface; and a first instruction sending unit 1003, configured to send a first instruction to a live-streaming server in response to the first operation, wherein the first instruction carries the target account, the live-streaming server is configured to send the first instruction to the second terminal, and the first instruction instructs the second terminal to perform a synchronization operation with the first terminal.

Figure 11:
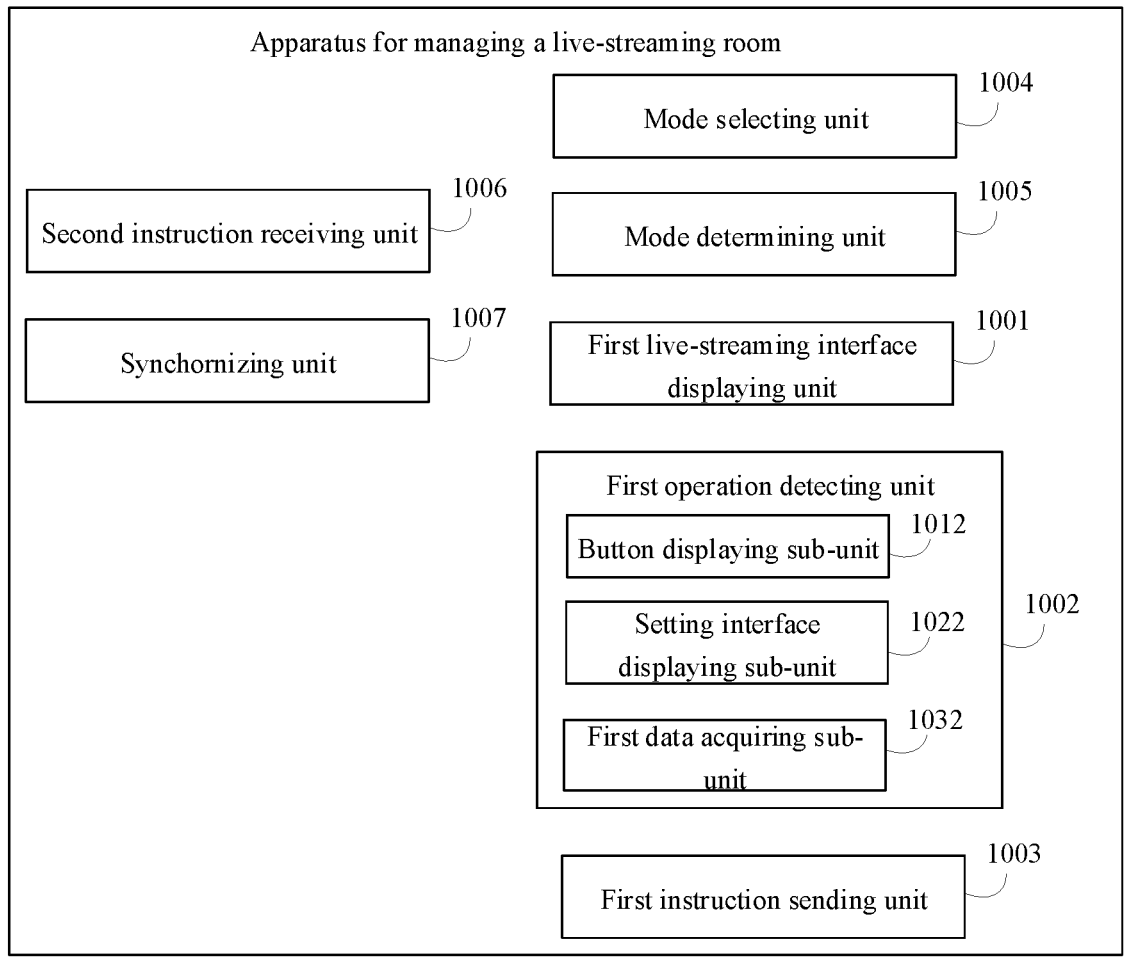
FIG. 11 is a block diagram of another apparatus for managing a live-streaming room according to an exemplary embodiment.

In some embodiments, referring to FIG. 11, the apparatus further includes:

a mode selecting unit 1004, configured to display a mode selection interface based on a trigger operation on a live-streaming portal in response to logging in based on the target account, the mode selection interface including a live-streaming mode option and a management mode option; and a mode determining unit 1005, configured to determine, in response to a selection operation for the management mode option, that the first terminal is currently in the management mode, and display the first live-streaming interface of the live-streaming room.

In some embodiments, the first operation detecting unit 1002 is configured to detect a first interaction initiation operation through the first live-streaming interface; and the first instruction sending unit 1003 is configured to send the first interaction initiation instruction to the live-streaming server in response to the first interaction initiation operation, wherein the first interaction initiation instruction carries the target account, and the live-streaming server is configured to send the first interaction initiation instruction to the second terminal, wherein the first interaction initiation instruction instructs the second terminal to display a live-streaming interaction interface in synchronization with the first terminal.

In some embodiments, referring to FIG. 11, the first operation detecting unit 1002 includes:

a button displaying sub-unit 1012, configured to display at least one interaction button through the first live-streaming interface;

a setting interface displaying sub-unit 1022, configured to display an interaction setting interface corresponding to a triggered interaction button in response to a trigger operation on any of the at least one interaction button; and a first data acquiring sub-unit 1032, configured to acquire predefined interaction data through the interaction setting interface, wherein the first interaction initiation instruction also carries the interaction data, wherein the interaction data including an interaction object and an interaction parameter of the interaction object, wherein the interaction object includes an object performing interaction in the live-streaming room; and the interaction parameter indicates an interaction mode of the interaction object.

In some embodiments, referring to FIG. 11, the apparatus further includes:

a second instruction receiving unit 1006, configured to receive a second instruction from the live-streaming server, wherein the second instruction is sent by the second terminal through a second live-streaming interface in response to detecting a second operation, and the second instruction carries the target account; and a synchronizing unit 1007, configured to perform a synchronization operation with the second terminal in response to the second instruction.

In some embodiments, referring to FIG. 11, the second instruction receiving unit 1006 is configured to receive a second interaction initiation instruction from the live-streaming server, wherein the second interaction initiation instruction is sent by the second terminal through the second live-streaming interface in response to detecting a second interaction initiation operation, and the second interaction initiation instruction carries the target account; and the synchronizing unit 1007 is configured to display a live-streaming interaction interface in synchronization with the second terminal in response to the second interaction initiation instruction.

In some embodiments, the second interaction initiation instruction also carries interaction data, wherein the interaction data includes an interaction object and an interaction parameter of the interaction object, wherein the interaction object includes an object performing interaction in the live-streaming room; the interaction parameter indicates an interaction mode of the interaction object; and the live-streaming interaction interface includes the interaction data.

With respect to the apparatus in the foregoing embodiment, the specific manner in which each unit performs the operation has been described in detail in the embodiment of the method, and thus detailed description is not given herein.

Figure 12:
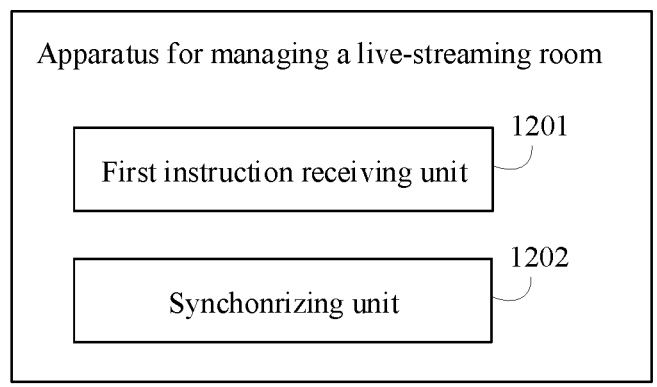
FIG. 12 is a block diagram of another apparatus for managing a live-streaming room according to an exemplary embodiment.

FIG. 12 is a block diagram of an apparatus for managing a live-streaming room according to an exemplary embodiment. The apparatus for managing a live-streaming room is applicable to the second terminal. Referring to FIG. 12, the apparatus includes:

a first instruction receiving unit 1201, configured to receive a first instruction from a live-streaming server, wherein the first instruction is sent by a first terminal and carries a target account; and a synchronizing unit 1202, configured to perform a synchronization operation with the first terminal in response to the first instruction;

wherein the first terminal includes a terminal in a management mode of the target account, and the first instruction is sent by the first terminal through a first live-streaming interface in response to detecting a first operation.

In some embodiments, the first instruction receiving unit 1201 is configured to receive a first interaction initiation instruction from the live-streaming server, wherein the first interaction initiation instruction is sent by the first terminal through the first live-streaming interface in response to detecting a first interaction initiation operation, and the first interaction initiation instruction carries the target account; and the synchronizing unit 1202 is configured to display a live-streaming interaction interface in synchronization with the first terminal in response to the first interaction initiation instruction.

In some embodiments, the first interaction initiation instruction also carries interaction data, wherein the interaction data includes an interaction object and an interaction parameter of the interaction object, wherein the interaction object includes an object performing interaction in the live-streaming room, the interaction parameter indicates an interaction mode of the interaction object; and the live-streaming interaction interface includes the interaction data.

Figure 13:
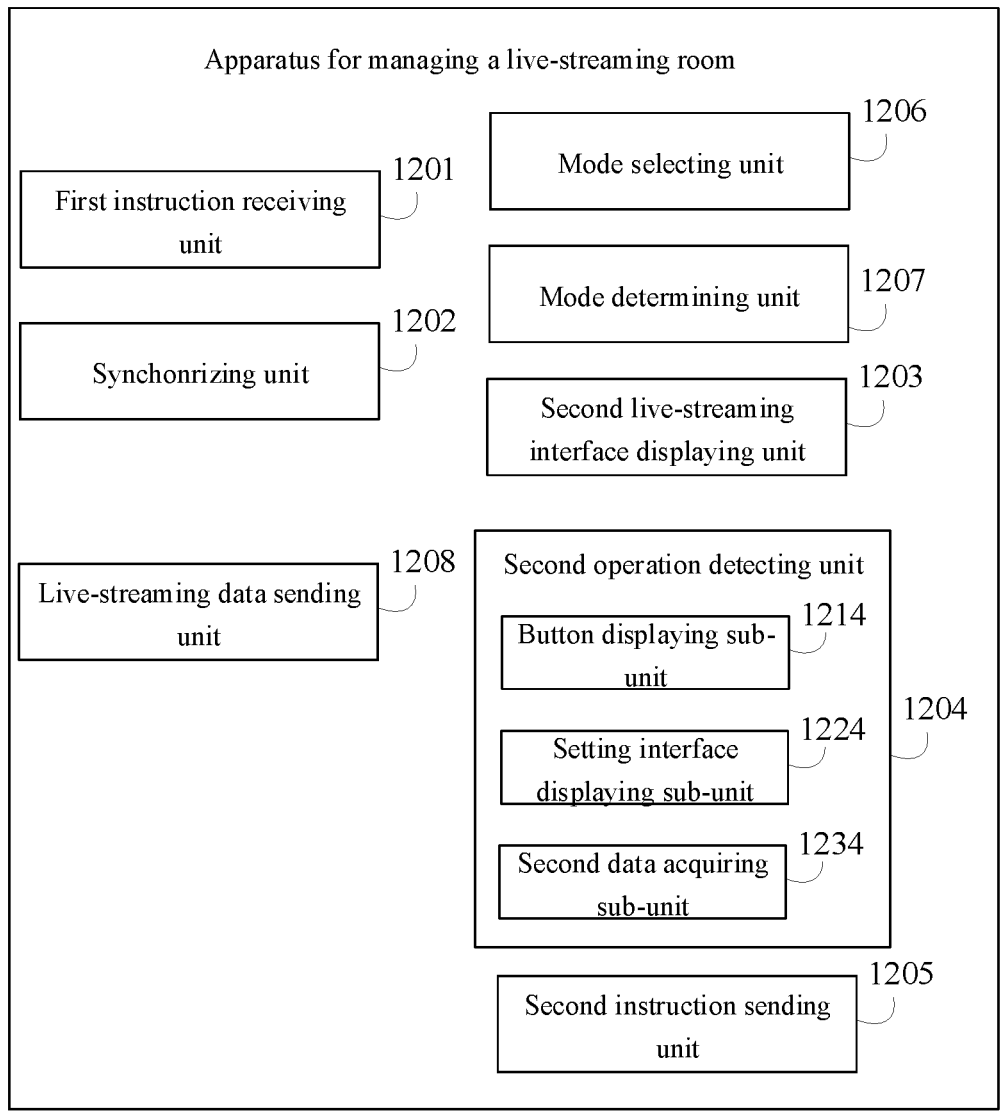
FIG. 13 is a block diagram of another apparatus for managing a live-streaming room according to an exemplary embodiment.

In some embodiments, referring to FIG. 13, the apparatus further includes:

a second live-streaming interface displaying unit 1203, configured to display a second live-streaming interface of the live-streaming room;

a second operation detecting unit 1204, configured to detect a second operation through the second live-streaming interface; and a second instruction sending unit 1205, configured to send a second instruction to the live-streaming server in response to the second operation, wherein the second instruction carries the target account, the live-streaming server is configured to send the second instruction to the first terminal, and the second instruction instructs the first terminal to perform a synchronization operation with the second terminal.

In some embodiments, referring to FIG. 13, the apparatus further includes:

a mode selecting unit 1206, configured to display a mode selection interface based on a trigger operation on a live-streaming portal in response to logging in based on the target account, the mode selection interface including a live-streaming mode option and a management mode option; and a mode determining unit 1207, configured to determine, in response to a selection operation for the live-streaming mode option, that the second terminal is currently in the live-streaming mode, and display the second live-streaming interface of the live-streaming room.

In some embodiments, referring to FIG. 13, the second operation detecting unit 1204 is configured to detect a second interaction initiation operation through the second live-streaming interface; and the second instruction sending unit 1205 is configured to send a second interaction initiation instruction to the live-streaming server in response to the second interaction initiation operation, wherein the second interaction initiation instruction carries the target account, the live-streaming server is configured to send the second interaction initiation instruction to the first terminal, and the second interaction initiation instruction instructs the first terminal to display a live-streaming interaction interface in synchronization with the second terminal.

In some embodiments, referring to FIG. 13, the second operation detecting unit 1204 includes:

a button displaying sub-unit 1214, configured to display at least one interaction button through the second live-streaming interface;

a setting interface displaying sub-unit 1224, configured to display an interaction setting interface corresponding to a triggered interaction button in response to a trigger operation on any of the at least one interaction button; and a second data acquiring sub-unit 1234, configured to acquire predefined interaction data through the interaction setting interface, wherein the second interaction initiation instruction also carries the interaction data, wherein the interaction data includes an interaction object and an interaction parameter of the interaction object, wherein the interaction object includes an object performing interaction in the live-streaming room; and the interaction parameter indicates an interaction mode of the interaction object.

In some embodiments, referring to FIG. 13, the apparatus further includes:

a live-streaming data sending unit 1208, configured to acquire live-streaming data and send the live-streaming data to the live-streaming server, wherein the live-streaming server is configured to send the live-streaming data to a terminal other than the second terminal in the live-streaming room.

With respect to the apparatus in the foregoing embodiment, the specific manner in which each unit performs the operation has been described in detail in the embodiment of the method, and thus detailed description is not given herein.

Figure 14:
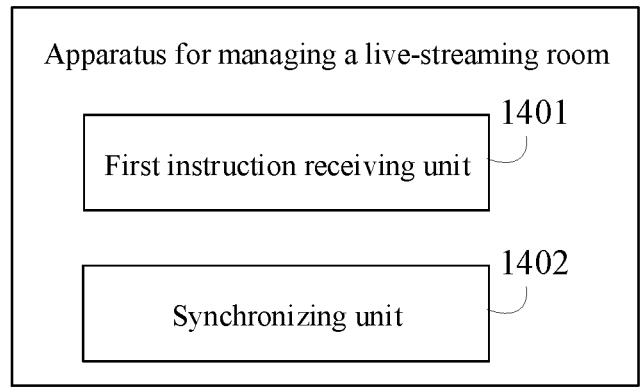
FIG. 14 is a block diagram of another apparatus for managing a live-streaming room according to an exemplary embodiment.

FIG. 14 is a block diagram of an apparatus for managing a live-streaming room according to an exemplary embodiment. The apparatus for managing the live-streaming room is applicable to a live-streaming server. Referring to FIG. 14, the apparatus includes:

a first instruction receiving unit 1401, configured to receive a first instruction from a first terminal in response to a second terminal being in a live-streaming mode of a target account and the first terminal being in a management mode of the target account, wherein the first instruction carries the target account; and a synchronizing unit 1402, configured to send the first instruction to the second terminal, wherein the first instruction instructs the second terminal to perform a synchronization operation with the first terminal;

wherein the first instruction is sent by the first terminal through a first live-streaming interface in response to detecting a first operation.

In some embodiments, the first instruction receiving unit 1401 is configured to receive a first interaction initiation instruction from the first terminal, wherein the first interaction initiation instruction carries the target account; and the synchronizing unit 1402 is configured to send the first interaction initiation instruction to the second terminal, wherein the first interaction initiation instruction instructs the second terminal to display a live-streaming interaction interface in synchronization with the first terminal;

wherein the first interaction initiation instruction is sent by the first terminal through the first live-streaming interface in response to detecting a first interaction initiation operation.

In some embodiments, the first interaction initiation instruction also carries interaction data, wherein the interaction data includes an interaction object and an interaction parameter of the interaction object, wherein the interaction object includes an object performing interaction in the live-streaming room, the interaction parameter indicates an interaction mode of the interaction object; and the live-streaming interaction interface includes the interaction data.

Figure 15:
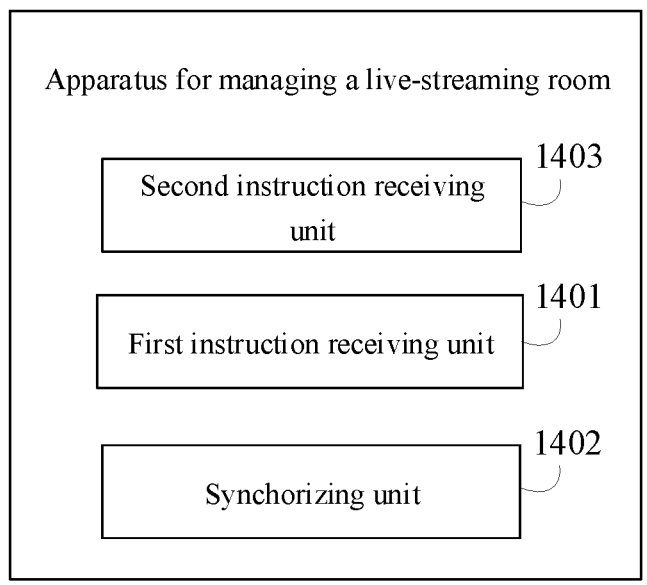
FIG. 15 is a block diagram of another apparatus for managing a live-streaming room according to an exemplary embodiment.

In some embodiments, referring to FIG. 15, the apparatus further includes:

a second instruction receiving unit 1403, configured to receive a second instruction from the second terminal, wherein the second instruction carries the target account; and the synchronizing unit 1402 is further configured to send the second instruction to the first terminal, wherein the second instruction instructs the first terminal to perform a synchronization operation with the second terminal;

wherein the second instruction is sent by the second terminal through the second live-streaming interface in response to detecting a second operation.

In some embodiments, the second instruction receiving unit 1403 is configured to receive a second interaction initiation instruction from the second terminal, wherein the second interaction initiation instruction carries the target account; and the synchronizing unit 1402 is further configured to send the second interaction initiation instruction to the first terminal, such that the first terminal displays a live-streaming interaction interface in synchronization with the second terminal in response to the second interaction initiation instruction;

wherein the second interaction initiation instruction is sent by the second terminal in response to detecting a second interaction initiation operation through the second live-streaming interface.

In some embodiments, the second interaction initiation instruction also carries interaction data, wherein the interaction data includes an interaction object and an interaction parameter of the interaction object, wherein the interaction object includes an object performing interaction in the live-streaming room, the interaction parameter indicates an interaction mode of the interaction object; and the live-streaming interaction interface includes the interaction data.

With respect to the apparatus in the foregoing embodiment, the specific manner in which each unit performs the operation has been described in detail in the embodiment of the method, and thus detailed description is not given herein.

Figure 16:
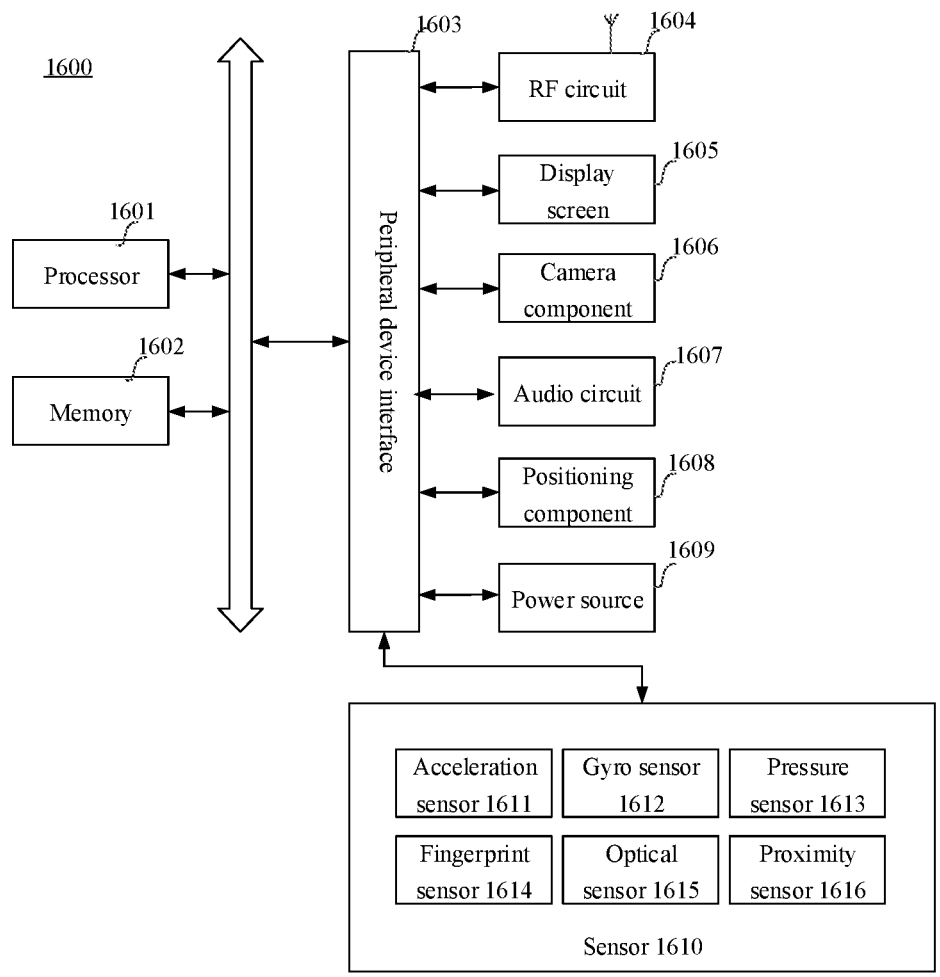
FIG. 16 is a block diagram of a terminal according to an exemplary embodiment.

FIG. 16 is a structural block diagram of a terminal 1600 according to an exemplary embodiment of the present disclosure. The terminal 1600 may be a portable mobile terminal, such as a smart phone, a tablet computer, a moving picture experts group audio layer III (MP3) player, a moving picture experts group audio layer IV (MP4) player, a laptop or desk computer. The terminal 1600 may also be a user equipment (UE), a portable terminal, a laptop terminal, a desk terminal, or the like.

Generally, the terminal 1600 includes a processor 1601 and a memory 1602.

The processor 1601 may include one or more processing cores, such as a 4-core processor and an 8-core processor. The processor 1601 may be implemented by at least one hardware of a digital signal processing (DSP), a field-programmable gate array (FPGA), and a programmable logic array (PLA). The processor 1601 may also include a main processor and a coprocessor. The main processor is a processor configured to process the data in an awake state, and is also called a central processing unit (CPU). The coprocessor is a low-power-consumption processor configured to process the data in a standby state. In some embodiments, the processor 1601 may be integrated with a graphics processing unit (GPU), which is configured to render and draw the content that needs to be displayed by a display screen. In some embodiments, the processor 1601 may also include an artificial intelligence (AI) processor configured to process computational operations related to machine learning.

The memory 1602 may include one or more computer-readable storage mediums, which may be non-transitory. The memory 1602 may also include a high-speed random access memory, as well as a non-volatile memory, such as one or more disk storage devices and flash storage devices. In some embodiments, a non-transitory computer-readable storage medium in the memory 1602 is configured to store at least one instruction, which is executed by the processor 1601 to implement the method for managing the live-streaming room according to the method embodiment of the present disclosure.

In some embodiments, the terminal 1600 may also include a peripheral device interface 1603 and at least one peripheral device. The processor 1601, the memory 1602, and the peripheral device interface 1603 may be connected by a bus or a signal line. Each peripheral device may be connected to the peripheral device interface 1603 by a bus, a signal line or a circuit board. Specifically, the peripheral device includes at least one of a radio frequency circuit 1604, a display screen 1605, a camera 1606, an audio circuit 1607, a positioning component 1608, and a power source 1609.

The peripheral device interface 1603 may be configured to connect at least one peripheral device associated with an input/output (I/O) to the processor 1601 and the memory 1602. In some embodiments, the processor 1601, the memory 1602 and the peripheral device interface 1603 are integrated on the same chip or circuit board. In some other embodiments, any one or two of the processor 1601, the memory 1602, and the peripheral device interface 1603 may be implemented on a separate chip or circuit board, which is not limited in the present embodiment.

The radio frequency circuit 1604 is configured to receive and transmit a radio frequency (RF) signal, which is also referred to as an electromagnetic signal. The radio frequency circuit 1604 communicates with a communication network and other communication devices via the electromagnetic signal. The radio frequency circuit 1604 converts the electrical signal into the electromagnetic signal for transmission, or converts the received electromagnetic signal into the electrical signal. In some embodiments, the RF circuit 1604 includes an antenna system, an RF transceiver, one or more amplifiers, a tuner, an oscillator, a digital signal processor, a codec chipset, a subscriber identity module card, and the like. The RF circuit 1604 may communicate with other terminals via at least one wireless communication protocol. The wireless communication protocol includes, but not limited to, World Wide Web, a metropolitan area network, intranet, various generations of mobile communication networks (2G, 3G, 4G, and 5G), a wireless local area network, and a wireless fidelity (Wi-Fi) network. In some embodiments, the RF circuit 1604 may also include near-field communication (NFC) related circuits, which is not limited in the present disclosure.

The display screen 1605 is configured to display a user interface (UI). The UI may include graphics, text, icons, videos, and any combination thereof. In the case that the display screen 1605 is a touch display screen, the display screen 1605 also has the capacity to acquire touch signals on or through the surface of the display screen 1605. The touch signal may be input into the processor 1601 as a control signal for processing. At this time, the display screen 1605 may also be configured to provide virtual buttons and/or virtual keyboards, which are also referred to as soft buttons and/or soft keyboards. In some embodiments, one display screen 1605 may be disposed on the front panel of the terminal 1600. In some other embodiments, at least two display screens 1605 may be disposed respectively on different surfaces of the terminal 1600 or in a folded design. In further embodiments, the display screen 1605 may be a flexible display screen disposed on the curved or folded surface of the terminal 1600. Even the display screen 1605 may have an irregular shape other than a rectangle. That is, the display screen 805 may be an irregular-shaped screen. The display screen 1605 may be prepared from a material such as a liquid crystal display (LCD), an organic light-emitting diode (OLED), or the like.

The camera component 1606 is configured to capture images or videos. In some embodiments of the present disclosure, the camera component 1606 includes a front camera and a rear camera. Usually, the front camera is placed on the front panel of the terminal, and the rear camera is placed on the back of the terminal. In some embodiments, at least two rear cameras are disposed, and are at least one of a main camera, a depth-of-field camera, a wide-angle camera, and a telephoto camera respectively, so as to realize a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera component 1606 may also include a flashlight. The flashlight may be a mono-color temperature flashlight or a two-color temperature flashlight. The two-color temperature flash is a combination of a warm flashlight and a cold flashlight and may be used for light compensation at different color temperatures.

The audio circuit 1607 may include a microphone and a speaker. The microphone is configured to collect sound waves of users and environments, and convert the sound waves into electrical signals which are input into the processor 1601 for processing, or input into the RF circuit 1604 for voice communication. For the purpose of stereo acquisition or noise reduction, there may be a plurality of microphones respectively disposed at different locations of the terminal 1600. The microphone may also be an array microphone or an omnidirectional acquisition microphone. The speaker is then configured to convert the electrical signals from the processor 1601 or the RF circuit 1604 into the sound waves. The speaker may be a conventional film speaker or a piezoelectric ceramic speaker. In the case that the speaker is the piezoelectric ceramic speaker, the electrical signal may be converted into not only human-audible sound waves but also the sound waves which are inaudible to humans for the purpose of ranging and the like. In some embodiments, the audio circuit 1607 may also include a headphone jack.

The positioning component 1608 is configured to position a current geographic location of the terminal 1600 to implement navigation or location-based services (LBSs). The positioning component 1608 may be the United States' Global Positioning System (GPS), Russia's Global Navigation Satellite System (GLONASS), China's BeiDou Navigation Satellite System (BDS), and the European Union's Galileo Satellite Navigation System (Galileo).

The power source 1609 is configured to power up various components in the terminal 1600. The power source 1609 may be alternating current, direct current, a disposable battery, or a rechargeable battery. In the case that the power source 1609 includes the rechargeable battery, the rechargeable battery may a wired rechargeable battery or a wireless rechargeable battery. The wired rechargeable battery is a battery charged over a wired line, and the wireless rechargeable battery is a battery charged over a wireless coil. The rechargeable battery may also support the fast-charging technology.

In some embodiments, the terminal 1600 also includes one or more sensors 1610. The one or more sensors 1610 include, but not limited to, an acceleration sensor 1611, a gyro sensor 1612, a pressure sensor 1613, a fingerprint sensor 1614, an optical sensor 1615, and a proximity sensor 1616.

The acceleration sensor 1611 may detect magnitudes of accelerations on three coordinate axes of a coordinate system established by the terminal 1600. For example, the acceleration sensor 1611 may be configured to detect components of a gravitational acceleration on the three coordinate axes. The processor 1601 may control the display screen 1605 to display a user interface in a landscape view or a portrait view according to a gravity acceleration signal collected by the acceleration sensor 1611. The acceleration sensor 1611 may also be configured to collect motion data of a game or a user.

The gyro sensor 1612 may detect a body direction and a rotation angle of the terminal 1600, and may cooperate with the acceleration sensor 1611 to collect a 3D motion of the user on the terminal 1600. Based on the data collected by the gyro sensor 1612, the processor 1601 may serve the following functions: motion sensing (such as changing the UI according to a user's tilt operation), image stabilization during shooting, game control and inertial navigation.

The force sensor 1613 may be disposed on a side frame of the terminal 1600 and/or a lower layer of the touch display screen 1605. In the case that the force sensor 1613 is disposed on the side frame of the terminal 1600, a user's holding signal to the terminal 1600 may be detected. The processor 1601 may perform left-right hand recognition or quick operation according to the holding signal collected by the force sensor 1613. In the case that the force sensor 1613 is disposed on the lower layer of the touch display screen 1605, the processor 1601 controls an operable control on the UI according to a user's press or touch operation on the display screen 1605. The operable control includes at least one of a button control, a scroll bar control, an icon control and a menu control.

The fingerprint sensor 1614 is configured to collect a user's fingerprint. The processor 1601 identifies the user's identity based on the fingerprint collected by the fingerprint sensor 1614, or the fingerprint sensor 1614 identifies the user's identity based on the collected fingerprint. In the case that the user's identity is identified as trusted, the processor 1601 authorizes the user to perform related sensitive operations, such as unlocking the screen, viewing encrypted information, downloading software, paying, and changing settings. The fingerprint sensor 1614 may be provided on the front, back, or side of the terminal 1600. In the case that the terminal 1600 is provided with a physical button or a manufacturer's logo, the fingerprint sensor 1614 may be integrated with the physical button or the manufacturers logo.

The optical sensor 1615 is configured to collect ambient light intensity. In one embodiment, the processor 1601 may control the display brightness of the display screen 1605 according to the ambient light intensity collected by the optical sensor 1615. Specifically, in the case that the ambient light intensity is high, the display brightness of the display screen 1605 is increased; and in the case that the ambient light intensity is low, the display brightness of the display screen 1605 is decreased. In some embodiments, the processor 1601 may also dynamically adjust shooting parameters of the camera component 1606 according to the ambient light intensity collected by the optical sensor 1615.

The proximity sensor 1616, also referred to as a distance sensor, is usually disposed on the front panel of the terminal 1600. The proximity sensor 1616 is configured to capture a distance between the user and a front surface of the terminal 1600. In one embodiment, in the case that the proximity sensor 1616 detects that the distance between the user and the front surface of the terminal 1600 becomes gradually smaller, the processor 1601 controls the display screen 1605 to switch from a screen-on state to a screen-off state. In response to detecting that the distance between the user and the front surface of the terminal 1600 gradually increases, the processor 1601 controls the display screen 1605 to switch from the screen-off state to the screen-on state.

It will be understood by those skilled in the art that the structure shown in FIG. 16 does not constitute a limitation to the terminal 1600, and may include more or less components than those illustrated, or combine some components or adopt different component arrangements.

An embodiment of the present disclose provides a first terminal. The first terminal includes one or more processors; and a volatile or non-volatile memory configured to store one or more instructions executable by the one or more processors; wherein the one or more processors, when loading and executing the one or more instructions, are caused to perform the following operations:

displaying a first live-streaming interface of the live-streaming room, wherein the first live-streaming interface includes live-streaming data provided by a second terminal, the first terminal includes a terminal in a management mode of a target account, and the second terminal includes a terminal in a live-streaming mode of the target account;

detecting a first operation through the first live-streaming interface; and sending a first instruction to a live-streaming server in response to the first operation, wherein the first instruction carries the target account, the live-streaming server is configured to send the first instruction to the second terminal, and the first instruction instructs the second terminal to perform a synchronization operation with the first terminal.

In some embodiments, the one or more processors, when loading and executing the one or more instructions, are caused to perform the following operations:

displaying a mode selection interface based on a trigger operation on a live-streaming portal in response to logging in based on the target account, wherein the mode selection interface includes a live-streaming mode option and a management mode option; and determining, in response to a selection operation for the management mode option, that the first terminal is currently in the management mode, and displaying the first live-streaming interface of the live-streaming room.

In some embodiments, the one or more processors, when loading and executing the one or more instructions, are caused to perform the following operations:

detecting a first interaction initiation operation through the first live-streaming interface; and sending the first interaction initiation instruction to the live-streaming server in response to the first interaction initiation operation, wherein the first interaction initiation instruction carries the target account, the live-streaming server is configured to send the first interaction initiation instruction to the second terminal, and the first interaction initiation instruction instructs the second terminal to display a live-streaming interaction interface in synchronization with the first terminal.

In some embodiments, the one or more processors, when loading and executing the one or more instructions, are caused to perform the following operations:

displaying at least one interaction button through the first live-streaming interface;

displaying an interaction setting interface corresponding to a triggered interaction button in response to a trigger operation on any of the at least one interaction button; and acquiring predefined interaction data through the interaction setting interface, wherein the first interaction initiation instruction further carries the interaction data, wherein the interaction data includes an interaction object and an interaction parameter of the interaction object, wherein the interaction object includes an object performing interaction in the live-streaming room, and the interaction parameter indicates an interaction mode of the interaction object.

In some embodiment, the one or more processors, when loading and executing the one or more instructions, are caused to perform the following operations:

receiving a second instruction from the live-streaming server, wherein the second instruction is sent by the second terminal through a second live-streaming interface in response to detecting a second operation, and the second instruction carries the target account; and performing a synchronization operation with the second terminal in response to the second instruction.

In some embodiments, the one or more processors, when loading and executing the one or more instructions, are caused to perform the following operations:

receiving a second interaction initiation instruction from the live-streaming server, wherein the second interaction initiation instruction is sent by the second terminal through the second live-streaming interface in response to detecting a second interaction initiation operation, and the second interaction initiation instruction carries the target account; and displaying the live-streaming interaction interface in synchronization with the second terminal in response to the second interaction initiation instruction.

In some embodiments, the second interaction initiation instruction further carries interaction data, wherein the interaction data includes an interaction object and an interaction parameter of the interaction object, wherein the interaction object includes an object performing interaction in the live-streaming room, the interaction parameter indicates an interaction mode of the interaction object; and the live-streaming interaction interface includes the interaction data.

An embodiment of the present disclosure provides a second terminal. The second terminal includes one or more processors; and a volatile or non-volatile memory configured to store one or more instructions executable by the one or more processors; wherein the one or more processors, when loading and executing the one or more instructions, are caused to perform the following operations:

receiving a first instruction from a live-streaming server, wherein the first instruction is sent by a first terminal and carries a target account; and performing a synchronization operation with the first terminal in response to the first instruction;

wherein the second terminal includes a terminal in a live-streaming mode of the target account, the first terminal includes a terminal in a management mode of the target account, and the first instruction is sent by the first terminal through a first live-streaming interface in response to detecting a first operation.

In some embodiments, the one or more processors, when loading and executing the one or more instructions, are caused to perform the following operations:

receiving a first interaction initiation instruction from the live-streaming server, wherein the first interaction initiation instruction is sent by the first terminal through the first live-streaming interface in response to detecting a first interaction initiation operation, and the first interaction initiation instruction carries the target account; and displaying a live-streaming interaction interface in synchronization with the first terminal in response to the first interaction initiation instruction.

In some embodiments, the first interaction initiation instruction further carries interaction data, wherein the interaction data includes an interaction object and an interaction parameter of the interaction object, wherein the interaction object includes an object performing interaction in the live-streaming room, the interaction parameter indicates an interaction mode of the interaction object; and the live-streaming interaction interface includes the interaction data.

In some embodiments, the one or more processors, when loading and executing the one or more instructions, are caused to perform the following operations:

displaying a second live-streaming interface of the live-streaming room corresponding to the target account;

detecting a second operation through the second live-streaming interface; and sending a second instruction to the live-streaming server in response to the second operation, wherein the second instruction carries the target account, the live-streaming server is configured to send the second instruction to the first terminal, and the second instruction instructs the first terminal to perform a synchronization operation with the second terminal.

In some embodiments, the one or more processors, when loading and executing the one or more instructions, are caused to perform the following operations:

displaying a mode selection interface based on a trigger operation on a live-streaming portal in response to logging in based on the target account, wherein the mode selection interface includes a live-streaming mode option and a management mode option; and determining, in response to a selection operation for the live-streaming mode option, that the second terminal is currently in the live-streaming mode, and displaying the second live-streaming interface of the live-streaming room.

In some embodiments, the one or more processors, when loading and executing the one or more instructions, are caused to perform the following operations:

detecting a second interaction initiation operation through the second live-streaming interface; and sending a second interaction initiation instruction to the live-streaming server in response to the second interaction initiation operation, wherein the second interaction initiation instruction carries the target account, and the live-streaming server is configured to send the second interaction initiation instruction to the first terminal, and the second interaction initiation instruction instructs the first terminal to display a live-streaming interaction interface in synchronization with the second terminal.

In some embodiments, the one or more processors, when loading and executing the one or more instructions, are caused to perform the following operations:

displaying at least one interaction button through the second live-streaming interface;

displaying an interaction setting interface corresponding to a triggered interaction button in response to a trigger operation on any of the at least one interaction button; and acquiring predefined interaction data through the interaction setting interface, wherein the second interaction initiation instruction further carries the interaction data, wherein the interaction data includes an interaction object and an interaction parameter of the interaction object, wherein the interaction object includes an object performing interaction in the live-streaming room, and the interaction parameter indicates an interaction mode of the interaction object.

In some embodiments, the one or more processors, when loading and executing the one or more instructions, are caused to perform the following operation:

acquiring live-streaming data, and sending the live-streaming data to the live-streaming server, wherein the live-streaming server is configured to send the live-streaming data to a terminal other than the second terminal in the live-streaming room.

Figure 17:
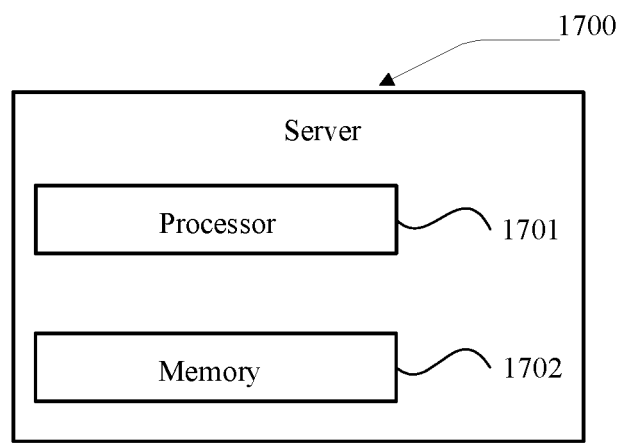
FIG. 17 is a block diagram of a server according to an exemplary embodiment.

FIG. 17 is a schematic structural diagram of a server according to an embodiment of the present disclosure. The server 1700 may vary greatly depending on different configurations or performances, and may include one or more central processing units (CPUs) 1701 and one or more memories 1702. The memory 1702 is configured to store at least one instruction therein, the at least one instruction being loaded and executed by the processor 1701 to implement the methods according to the above method embodiments. The server may also be provided with a wired or wireless network interface, a keyboard, an input/output interface and other components for input and output. The server may also include other components configured to implement device functions, which are not described in detail herein.

The server 1700 may be configured to perform the operations performed by the server in the above-mentioned method for managing the live-streaming room.

An embodiment of the present disclosure provides a live-streaming server. The live-streaming server includes one or more processors; and a volatile or non-volatile memory configured to store one or more instructions executable by the one or more processors; wherein the one or more processors, when loading and executing the one or more instructions, are caused to perform the following operations:

receiving a first instruction from a first terminal in response to a second terminal being in a live-streaming mode of a target account and the first terminal being in a management mode of the target account, wherein the first instruction carries the target account; and sending the first instruction to the second terminal, such that the second terminal performs a synchronization operation with the first terminal in response to the first instruction;

wherein the first instruction is sent by the first terminal through a first live-streaming interface in response to detecting a first operation.

In some embodiments, the one or more processors, when loading and executing the one or more instructions, are caused to perform the following operation:

receiving a first interaction initiation instruction from the first terminal, wherein the first interaction initiation instruction carries the target account; and sending the first interaction initiation instruction to the second terminal, such that the second terminal displays a live-streaming interaction interface in synchronization with the first terminal in response to the first interaction initiation instruction;

wherein the first interaction initiation instruction is sent by the first terminal through the first live-streaming interface in response to detecting a first interaction initiation operation.

In some embodiments, the first interaction initiation instruction further carries interaction data, wherein the interaction data includes an interaction object and an interaction parameter of the interaction object, wherein the interaction object includes an object performing interaction in the live-streaming room, the interaction parameter indicates an interaction mode of the interaction object; and the live-streaming interaction interface includes the interaction data.

In some embodiments, the one or more processors, when loading and executing the one or more instructions, are caused to perform the following operation:

receiving a second instruction from the second terminal, wherein the second instruction carries the target account; and sending the second instruction to the first terminal, such that the first terminal performs a synchronization operation with the second terminal in response to the second instruction;

wherein the second instruction is sent by the second terminal through the second live-streaming interface in response to detecting a second operation.

In some embodiments, the one or more processors, when loading and executing the one or more instructions, are caused to perform the following operation:

receiving a second interaction initiation instruction from the second terminal, wherein the second interaction initiation instruction carries the target account; and sending the second interaction initiation instruction to the first terminal, such that the first terminal displays the live-streaming interaction interface in synchronization with the second terminal in response to the second interaction initiation instruction;

wherein the second interaction initiation instruction is sent by the second terminal in response to detecting a second interaction initiation operation through the second live-streaming interface.

In some embodiments, the second interaction initiation instruction further carries interaction data, wherein the interaction data includes an interaction object and an interaction parameter of the interaction object, wherein the interaction object includes an object performing interaction in the live-streaming room, the interaction parameter indicates an interaction mode of the interaction object; and the live-streaming interaction interface includes the interaction data.

An embodiment of the present disclosure further provides a non-transitory computer-readable storage medium. The non-transitory computer-readable storage medium includes a computer program storing one or more instructions therein. The one or more instructions, when loaded and executed by a processor of an electronic device, cause the electronic device to perform the method for managing the live-streaming room as described above.

An embodiment of the present disclosure further provides a computer program product. The computer program product stores one or more instructions. The one or more instructions, when loaded and executed by a processor of an electronic device, cause the electronic device to perform the method for managing the live-streaming room as described above.

All the embodiments of the present disclosure can be executed individually or in combination with other embodiments, and they are all regarded as the protection scope of the present disclosure.

What is claimed is:

1. A method for managing a live-streaming room, applicable to a first terminal, comprising:

displaying a first live-streaming interface of the live-streaming room, wherein the first live-streaming interface comprises live-streaming data provided by a second terminal, the first terminal is a terminal in a management mode of an anchor account, and the second terminal is a terminal in a live-streaming mode of the anchor account;

detecting a first interaction initiation operation through the first live-streaming interface, and displaying a live-streaming interaction interface in response to the detected first interaction initiation operation; and sending a first interaction initiation instruction to a live-streaming server in response to the detected first interaction initiation operation, wherein the first interaction initiation instruction carries the anchor account and interaction data, wherein the live-streaming server is configured to send the first interaction initiation instruction to the second terminal and a third terminal, wherein the third terminal is an audience terminal that is logged in an account other than the anchor account in the live-streaming room and is configured to watch live-streaming, wherein the first interaction initiation instruction instructs the second terminal to synchronize the interaction data and to display a same interface in the second terminal as that of the first terminal, and the first interaction initiation instruction further instructs the third terminal to display a corresponding interaction interface, and wherein the live-streaming interaction interface displayed by the first terminal and the second terminal is configured to display the interaction data, the corresponding interaction interface displayed by the third terminal is configured to interact with audience in the live-streaming room, and the live-streaming interaction interface displayed by the first terminal and the second terminal is different from the corresponding interaction interface displayed by the third terminal.

2. The method according to claim 1, further comprising:

displaying a mode selection interface based on a trigger operation on a live-streaming portal in response to logging in based on the anchor account, wherein the mode selection interface comprises a live-streaming mode option and a management mode option; and determining, in response to a selection operation for the management mode option, that the first terminal is currently in the management mode, and displaying the first live-streaming interface of the live-streaming room.

3. The method according to claim 1, wherein said detecting the first interaction initiation operation through the first live-streaming interface comprises:

displaying at least one interaction button through the first live-streaming interface;

displaying an interaction setting interface corresponding to a triggered interaction button in response to a trigger operation on any of the at least one interaction button; and acquiring predefined interaction data through the interaction setting interface, wherein the first interaction initiation instruction further carries the predefined interaction data, wherein the predefined interaction data comprises an interaction object and an interaction parameter of the interaction object, wherein the interaction object comprises an object performing interaction in the live-streaming room, and the interaction parameter indicates an interaction mode of the interaction object.

4. The method according to claim 1, further comprises:

receiving a second interaction initiation instruction from the live-streaming server, wherein the second interaction initiation instruction is sent by the second terminal through a second live-streaming interface in response to detecting a second interaction initiation operation, and the second interaction initiation instruction carries the anchor account; and displaying a live-streaming interaction interface in synchronization with the second terminal in response to the second interaction initiation instruction.

5. The method according to claim 4, wherein the second interaction initiation instruction further carries interaction data, wherein the interaction data comprises an interaction object and an interaction parameter of the interaction object, wherein the interaction object comprises an object performing interaction in the live-streaming room, the interaction parameter indicates an interaction mode of the interaction object; and the live-streaming interaction interface comprises the interaction data.

6. The method according to claim 1, further comprising:

receiving a second instruction from the live-streaming server, wherein the second instruction is sent by the second terminal through a second live-streaming interface in response to detecting a second operation, and the second instruction carries the anchor account; and performing a synchronization operation with the second terminal in response to the second instruction.

7. A method for managing a live-streaming room, applicable to a second terminal, comprising:

receiving a first interaction initiation instruction from a live-streaming server, wherein the first interaction initiation instruction is sent by a first terminal through a first live-streaming interface in response to detecting a first interaction initiation operation, wherein the first terminal is in a management mode of an anchor account and the second terminal is in a live-streaming mode of the anchor account, and wherein the first interaction initiation instruction instructs the first terminal to display a live-streaming interaction interface and carries the anchor account and interaction data; and performing a synchronization operation with the first terminal and displaying a same interface in the second terminal as that of the first terminal, in response to the first interaction initiation instruction;

wherein the live-streaming server is configured to send the first interaction initiation instruction to a third terminal, and the first interaction initiation instruction instructs the third terminal to display a corresponding interaction interface, wherein the third terminal is an audience terminal logged in an account other than the anchor account in the live-streaming room, is configured to watch live-streaming; and wherein the live-streaming interaction interface displayed by the first terminal and the second terminal is configured to display the interaction data, the corresponding interaction interface displayed by the third terminal is configured to interact with audience in the live-streaming room, and the live-streaming interaction interface displayed by the first terminal and the second terminal is different from the corresponding interaction interface displayed by the third terminal.

8. The method according to claim 7, wherein the first interaction initiation instruction further carries interaction data, wherein the interaction data comprises an interaction object and an interaction parameter of the interaction object, wherein the interaction object comprises an object performing interaction in the live-streaming room, the interaction parameter indicates an interaction mode of the interaction object; and the live-streaming interaction interface comprises the interaction data.

9. The method according to claim 7, further comprising:
displaying a mode selection interface based on a trigger operation on a live-streaming portal in response to logging in based on the anchor account, wherein the mode selection interface comprises a live-streaming mode option and a management mode option; and
determining, in response to a selection operation for the live-streaming mode option, that the second terminal is currently in the live-streaming mode, and displaying a second live-streaming interface of the live-streaming room.

10. The method according to claim 7, further comprises:
detecting a second interaction initiation operation through a second live-streaming interface; and
sending a second interaction initiation instruction to the live-streaming server in response to the second interaction initiation operation, wherein the second interaction initiation instruction carries the anchor account, and the live-streaming server is configured to send the second interaction initiation instruction to the first terminal, and the second interaction initiation instruction instructs the first terminal to display a live-streaming interaction interface in synchronization with the second terminal.

11. The method according to claim 10, wherein said detecting the second interaction initiation operation through the second live-streaming interface comprises:
displaying at least one interaction button through the second live-streaming interface;
displaying an interaction setting interface corresponding to a triggered interaction button in response to a trigger operation on any of the at least one interaction button; and
acquiring predefined interaction data through the interaction setting interface, wherein the second interaction initiation instruction further carries the predefined interaction data, wherein the predefined interaction data comprises an interaction object and an interaction parameter of the interaction object, wherein the interaction object comprises an object performing interaction in the live-streaming room, and the interaction parameter indicates an interaction mode of the interaction object.

12. The method according to claim 7, further comprising:
acquiring live-streaming data, and sending the live-streaming data to the live-streaming server, wherein the live-streaming server is configured to send the live-streaming data to a terminal other than the second terminal in the live-streaming room.

13. The method according to claim 7, further comprising:
displaying a second live-streaming interface of the live-streaming room corresponding to the anchor account;
detecting a second operation through the second live-streaming interface; and
sending a second instruction to the live-streaming server in response to the detected second operation, wherein the second instruction carries the anchor account, the live-streaming server is configured to send the second instruction to the first terminal, and the second instruction instructs the first terminal to perform a synchronization operation with the second terminal.

14. An electronic device implemented as a first terminal for managing a live-streaming room, the electronic device comprising:
one or more processors; and
a volatile or non-volatile memory configured to store one or more instructions executable by the one or more processors,
wherein the one or more processors, when loading and executing the one or more instructions, are caused to perform the following operations:
displaying a first live-streaming interface of the live-streaming room, wherein the first live-streaming interface comprises live-streaming data provided by a second terminal, the first terminal is a terminal in a management mode of an anchor account, and the second terminal is a terminal in a live-streaming mode of the anchor account; and
detecting a first interaction initiation operation through the first live-streaming interface, and displaying a live-streaming interaction interface in response to the detected first interaction initiation operation;
sending a first interaction initiation instruction to a live-streaming server in response to the detected first interaction initiation operation, wherein the first interaction initiation instruction carries the anchor account and interaction data, wherein the live-streaming server is configured to send the first interaction initiation instruction to the second terminal and a third terminal, wherein the third terminal is an audience terminal that is logged in an account other than the anchor account in the live-streaming room and is configured to watch live-streaming,
wherein the first interaction initiation instruction instructs the second terminal to perform a synchronization operation with the first terminal and to display a same interface in the second terminal as that of the first terminal, and the first interaction initiation instruction further instructs the third terminal to display a corresponding interaction interface;
and
wherein the live-streaming interaction interface displayed by the first terminal and the second terminal is configured to display the interaction data, the corresponding interaction interface displayed by the third terminal is configured to interact with audience in the live-streaming room, and the live-streaming interaction interface displayed by the first terminal and the second terminal is different from the corresponding interaction interface displayed by the third terminal.

15. The electronic device according to claim 14, wherein the one or more processors, when loading and executing the one or more instructions, are caused to perform the following operations:
displaying a mode selection interface based on a trigger operation on a live-streaming portal in response to logging in based on the anchor account, wherein the mode selection interface comprises a live-streaming mode option and a management mode option; and
determining, in response to a selection operation for the management mode option, that the first terminal is currently in the management mode, and displaying the first live-streaming interface of the live-streaming room.

16. The electronic device according to claim 14, wherein the one or more processors, when loading and executing the one or more instructions, are caused to perform the following operations:

displaying at least one interaction button through the first live-streaming interface;

displaying an interaction setting interface corresponding to a triggered interaction button in response to a trigger operation on any of the at least one interaction button; and acquiring predefined interaction data through the interaction setting interface, wherein the first interaction initiation instruction further carries the predefined interaction data, wherein the predefined interaction data comprises an interaction object and an interaction parameter of the interaction object, wherein the interaction object comprises an object performing interaction in the live-streaming room, and the interaction parameter indicates an interaction mode of the interaction object.

17. The electric device according to claim 14, wherein the one or more processors, when loading and executing the one or more instructions, are caused to perform the following operations:

receiving a second instruction from the live-streaming server, wherein the second instruction is sent by the second terminal through a second live-streaming interface in response to detecting a second operation, and the second instruction carries the anchor account; and performing a synchronization operation with the second terminal in response to the second instruction.

\* \* \* \* \*